US009147079B2

(12) United States Patent
Furukawa

(10) Patent No.: US 9,147,079 B2
(45) Date of Patent: Sep. 29, 2015

(54) ENCRYPTED DATABASE SYSTEM, CLIENT TERMINAL, ENCRYPTED DATABASE SERVER, NATURAL JOINING METHOD, AND PROGRAM

(75) Inventor: Jun Furukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/819,106

(22) PCT Filed: Jul. 12, 2011

(86) PCT No.: PCT/JP2011/065855
§ 371 (c)(1),
(2), (4) Date: Feb. 26, 2013

(87) PCT Pub. No.: WO2012/043012
PCT Pub. Date: Apr. 5, 2012

(65) Prior Publication Data
US 2013/0159731 A1      Jun. 20, 2013

(30) Foreign Application Priority Data

Sep. 28, 2010  (JP) ................................ 2010-217008

(51) Int. Cl.
G06F 21/60        (2013.01)
H04L 9/08         (2006.01)
G06F 21/62        (2013.01)

(52) U.S. Cl.
CPC .......... *G06F 21/602* (2013.01); *G06F 21/6227* (2013.01); *H04L 9/0861* (2013.01); *G06F 2221/2107* (2013.01); *H04L 9/0894* (2013.01)

(58) Field of Classification Search
None
See application file for complete search history.

(56) References Cited

U.S. PATENT DOCUMENTS 7,093,137 B1     8/2006  Sato et al.
7,743,069 B2 *   6/2010  Chitkara et al. .............. 707/781
(Continued)

FOREIGN PATENT DOCUMENTS

JP    02-132559 A    5/1990
JP    9-510565 A    10/1997
(Continued)

OTHER PUBLICATIONS

Encrypting Data Values in DB2 Universal Database, IBM deveoper works, Aug. 14, 2001.*
(Continued)

*Primary Examiner* — Dede Zecher
*Assistant Examiner* — Richard McCoy
(74) *Attorney, Agent, or Firm* — Sughrue Mion, PLLC

(57) ABSTRACT

A client terminal is provided with: a column encryption unit that, from an encryption key, a table identifier, and a column identifier, generates a column private key, a column public key, and a comparison value, from which the unit generates a concealed comparison value and a ciphertext, thus encryption a particular column; and an encrypted table natural joining request unit that issues a natural joining request text that requests natural joining related to the column encrypted from the encryption key, table identifier, and column identifier. The natural joining request text contains as a table joining key the column public key and column private key that were generated by the encryption key from the table identifier of a first and second tables and the column identifier of the a-th column and b-th column. Then, an encrypted database server executes natural joining using the table joining key, and returns the result.

10 Claims, 18 Drawing Sheets

(56) References Cited

U.S. PATENT DOCUMENTS

| | | | |
|---|---|---|---|
| 7,797,342 B2* | 9/2010 | Banks et al. | 707/783 |
| 8,639,947 B2* | 1/2014 | Elovici et al. | 713/193 |
| 2006/0041533 A1* | 2/2006 | Koyfman | 707/3 |
| 2007/0074047 A1 | 3/2007 | Metzger et al. | |

FOREIGN PATENT DOCUMENTS

| | | |
|---|---|---|
| JP | 10-124533 A | 5/1998 |
| JP | 2000-267565 A | 9/2000 |
| JP | 2001-101055 A | 4/2001 |
| JP | 2004-234344 A | 8/2004 |
| JP | 2004-362123 A | 12/2004 |
| JP | 2008-517354 A | 5/2008 |
| JP | 2009-510616 A | 3/2009 |
| WO | 95/26003 A1 | 9/1995 |
| WO | 2005/114478 A2 | 12/2005 |
| WO | 2007/038509 A2 | 4/2007 |

OTHER PUBLICATIONS

Pinal Dave, Journey to SQL Authority with Pinal Dave, sqlauthority.com, Apr. 28, 2009.*

Paul Needham, et al., "Oracle Advanced Security Technical White Paper", Oracle Japan, Internet <URL:http://otndnid.oracle.co.jp/products/database/oracle11g/, Jun. 2007, "Searched Sep. 3, 2010", pp. 1-19.

Hiroyuki Kitagawa, "Database System", Shokodo, Jul. 1996, pp. 1-11.

* cited by examiner

FIG. 15

TABLE A

| USER NAMES | CREDIT CARD NUMBERS |
|---|---|
| AOYAMA | 12334 |
| IMAI | 30785 |
| UEDA | 48929 |
| EGUCHI | 59876 |
| OKAMOTO | 29864 |
| ... | ... |

ENCRYPTED TABLE A

| USER NAMES | CREDIT CARD NUMBERS |
|---|---|
| AOYAMA | enc(key,12334) |
| IMAI | enc(key,30785) |
| UEDA | enc(key,48929) |
| EGUCHI | enc(key,59876) |
| OKAMOTO | enc(key,29864) |
| ... | ... |

ENCRYPTED TABLE A

941 →

| USER NAMES | CREDIT CARD NUMBERS |
|---|---|
| AOYAMA | enc(key,12334) |
| IMAI | enc(key,30785) |
| ... | ... |

FIG. 17B

ENCRYPTED TABLE B

942 →

| CREDIT CARD NUMBERS | CREDIT CARD EXPIRATION DATES |
|---|---|
| enc(key',12334) | 2012/5/18 |
| enc(key',30785) | 2011/9/17 |
| ... | ... |

FIG. 17C

TABLE A × B

981 →

| USER NAMES | CREDIT CARD NUMBERS | CREDIT CARD EXPIRATION DATES |
|---|---|---|
| AOYAMA | 12334 | 2012/5/18 |
| IMAI | 30785 | 2011/9/17 |
| ... | ... | ... |

FIG. 18A

ENCRYPTED TABLE C

1001 →

| USER NAMES | CREDIT CARD NUMBERS |
|---|---|
| EGUCHI | enc(key,59786) |
| OKAMOTO | enc(key,29864) |
| ... | ... |

FIG. 18B

ENCRYPTED TABLE D

1002 →

| CREDIT CARD NUMBERS | BLACK LIST REGISTERED DATES |
|---|---|
| enc(key,59786) | 2007/3/3 |
| enc(key,29864) | 2006/6/6 |
| ... | ... |

FIG. 18C

ENCRYPTED TABLE C × D

1003 →

| USER NAMES | CREDIT CARD NUMBERS | BLACK LIST REGISTERED DATES |
|---|---|---|
| EGUCHI | enc(key,59786) | 2007/3/3 |
| OKAMOTO | enc(key,29864) | 2006/6/6 |
| ... | ... | ... |

ENCRYPTED DATABASE SYSTEM, CLIENT TERMINAL, ENCRYPTED DATABASE SERVER, NATURAL JOINING METHOD, AND PROGRAM

CROSS REFERENCE TO RELATED APPLICATIONS

This application is a National Stage of International Application No. PCT/JP2011/065855 filed Jul. 12, 2011, claiming priority based on Japanese Patent Application No. 2010-217008 filed Sep. 28, 2010, the contents of all of which are incorporated herein by reference in their entirety.

TECHNICAL FIELD

The present invention relates to an encrypted database system, a client terminal, an encrypted database server, a natural joining method, and a program thereof. More specifically, the present invention relates to an encrypted database system and the like capable of performing natural joining of a plurality of tables of an encrypted database without completely decoding each element of the data.

BACKGROUND ART

Because the base bones of business works in enterprises are being computerized, most of the enterprises come to have large-scaled databases that hold a great amount of data used in those business works. Those data are important data in terms of the business works, so that it is absolutely essential to prevent those data from being leaked to outside also in terms of protecting personal information. Therefore, it is common to encrypt the data to be held in such large-scaled databases.

A database can be considered as an aggregate of a large number of tables. "Natural joining" herein means to join two tables into one by integrating columns when there are the columns showing same data in the two tables. Hereinafter, a typical method depicted in Non-Patent Document 1 and the like executed for naturally joining two tables in a database in which the held data is encrypted (referred to as an encrypted database hereinafter) will be described.

FIG. 11 is an explanatory chart showing the structure of an encrypted database system 901 according to a typical technique regarding the encrypted database. The encrypted database system 901 is constituted with a client terminal 910 and an encrypted database server 950 mutually connected via a LAN (Local Area Network) and the like.

The client terminal 910 has the structure as a typical computer device. That is, the client terminal 910 includes a main computation control module (CPU: Central Processing unit) 911 as the main unit for executing computer programs, a recording module 912 for recording data, an input module 913 for accepting operations done by the user, and an output module 914 for presenting processing results to the user, and a communication module 915 for performing data communications with other computers.

In the main computation control module 911, a column encryption unit 921 and an encrypted table natural joining request unit 922 are structured to execute respective functions to be described later as each computer program according to an operation command from the user. Further, in the recording module 912, each of individual private key 931a and private key' 931b used in processing to be described later is stored. Furthermore, a table A932 and a table B933 to be the targets of encryption and natural joining are inputted to the input module 913.

The encrypted database server 950 also has the structure as a typical computer device. That is, the encrypted database server 950 includes a main computation control module 951 as the main unit for executing computer programs, a recording module 952 for recording data, and a communication module 953 for performing data communications with other computers.

In the main computation control module 951, an encrypted table natural joining unit 963 and a data reception unit 964 are structured to execute respective functions to be described later as computer programs according to an operation command from the client terminal 910.

Further, an encrypted table A941 and an encrypted table B942 which are encryptions of each of the tables A933 and B934, as well as a public key pkey 972a and a public key pkey' 972b corresponding, respectively, to the private key key 931a and the private key key' 931b of the client terminal 910 received by the data reception unit 964 from the client terminal 910 are stored in the recording module 952.

FIG. 12 is an explanatory chart for describing the functions of the column encryption unit 921 shown in FIG. 11 in more details. The column encryption unit 921 includes an encrypting function 921a and a table update function 921b. The encrypting function 921a encrypts a specific column (referred to as column a) of the table A932 by using the private key key 931a and outputs a ciphertext 943. The table update function 921b outputs the table in which each data of the column a is replaced with the ciphertext 943 as an encrypted table A941 and transmits it to the encrypted database server 950. In the encrypted database server 950, the data reception unit 964 records those to the recording module 952.

The column encryption unit 921 also outputs an encrypted table B942 in which a specific column (referred to as column b) of the table B933 is replaced with a ciphertext by using a private key key' 931b, and records it to the recording module 912. Note that a table identifier 932a="A" of the encrypted table A941, a column identifier 932c="a" of the column a, a table identifier 933a="B" of the encrypted table B942, and a column identifier 933c="b" of the column b are not the targets of encryption, respectively, so that those are stored to the recording module 952 along with the encrypted table A941 and the encrypted table B942 and also stored to the recording module 912 of the client terminal 910 at the same time.

FIG. 13 is an explanatory chart for describing functions of the encrypted table natural joining request unit 922 shown in FIG. 11 in more details. The encrypted table natural joining request unit 922 issues a natural joining request text 971 for giving a command to naturally join the encrypted table A941 and the encrypted table B942 regarding the column a and the column b based on the table identifier 932a="A" of the encrypted table A941, the column identifier 932c="a" of the column a, the table identifier 933a="B" of the encrypted table B942, and the column identifier 933c="b" of the column b, and transmits it to the encrypted database server 950. In the encrypted database server 950, the data reception unit 964 upon receiving it operates the encrypted table natural joining unit 963 according to the natural joining request text 971.

FIG. 14 is an explanatory chart for describing functions of the encrypted table natural joining unit 963 shown in FIG. 11 in more details. The encrypted table natural joining unit 963 includes a decoding function 963a, a natural joining function 963b, and a re-encrypting function 963c. The decoding function 963a decodes the data of the column a and the column b encrypted in the encrypted table A941 and the encrypted table B942 by using the public key pkey 972a and the public key pkey' 972b corresponding to the private key key 931a and the private key key' 931*b*, respectively, to acquire the table A932 and the table B933 which are in the state before being encrypted.

The natural joining function 963*b* performs natural joining of the table A932 and the table B933 regarding the column a of the table A932 and the column b of the table B933 according to the command given by the natural joining request text 971. The re-encrypting function 963*c* re-encrypts the column a (column b) as the key of the joined table A932 and the table B933, and returns the acquired encrypted table A×B981 to the client terminal 910. The public key pkey 972*a* is used herein for the re-encryption. However, other encryption keys may also be used naturally.

FIG. 15 is an explanatory chart showing an example of the table A932 before being encrypted in the encrypted database management device 910 shown in FIG. 11. In the example shown in FIG. 15, the corresponding relation between the card numbers corresponding to the respective user names are shown by setting the first column of the table A932 as "user names" and the second column as "credit card numbers".

Regarding the data to be concealed, the encrypted database management device 910 encrypts the target data with an encryption function enc such as Hash function by using the private key "key" for the data to be concealed. FIG. 16 is an explanatory chart showing the encrypted table A941 that is in a state acquired by encrypting the table A932 shown in FIG. 15 done by the column encrypting unit 921 shown in FIG. 11. Here, the second column "credit card numbers" is taken as the target to be concealed, and the data acquired by encrypting a plain text m with an encryption key is expressed as enc (key, m).

The private key "key" is inherently given to each table. Encryption is definite, so that the value of enc (key, m) is uniquely determined when the plain text m and the private key "key" are settled. Note, however, that the encryption function enc is desirable to be an irreversible function such as a Hash function.

With this, even when the encrypted table A941 shown in FIG. 15 is leaked to the outside, the credit card number is not leaked unless the private key "key" is also leaked. Further, for the proper user having the private key "key", the table can be searched by using the credit card number. For example, when searching the user having the credit card number "12334", the search can be done by using enc (key, 12334).

As technical documents related thereto, there are following documents. Depicted in Patent Document 1 is an encryption/decoding device which can transmit/receive encrypted information containing key recovery information which can recover a decoding key even when the user loses the decoding key in transmission/reception of encrypted data. Depicted in Patent Document 2 is a natural joining high-speed calculation method which enables high-speed search of a table that is acquired by joining two tables.

Depicted in Patent Document 3 is a joining size evaluation method which is capable of decreasing the calculation cost required for performing equi-joining. Depicted in Patent Document 4 is a database inquiry system which guides the user so that the user can generate a proper SQL (Structured Query Language) text.

Depicted in Non-Patent Document 1 is an existing technique regarding the encrypted database described above. Depicted in Non-Patent Document 2 is a typical content of a database including natural joining of tables.

Patent Document 1: Japanese Unexamined Patent Document 2000-267565

Patent Document 2: Japanese Unexamined Patent Document Hei 02-132559

Patent Document 3: Japanese Unexamined Patent Document Hei 10-124533

Patent Document 4: Japanese Patent Application Publication Hei 09-510565

Non-Patent Document 1: Paul Needham et al., "Oracle Advanced Security Technical White Paper", Oracle Japan, June 2007, "Searched Sep. 3, 2010", Non-Patent Document 2: Hiroyuki Kitagawa, "Database System", Shokodo, July 1996

With the database, not only necessary data is extracted from a vast amount of data but also a plurality of tables are joined frequently by SQL commands and the like. Even for the encrypted data, it is naturally desired to be able to do calculations for performing natural joining of the tables easily without threatening the security.

However, the encryption key "key" is given inherently to each table as described above, so that different encryption keys are given to different tables. Thus, the same data on different tables are different data when encrypted with different encryption keys. Therefore, in order to perform a calculation for joining different tables regarding the data encrypted by the column encryption unit 921 by using the encrypted database management device 901 shown in FIG. 11, it is necessary to join the data by decoding it once as described above.

This will be described more specifically. FIG. 17 is an explanatory chart regarding an example of a case where the encrypted database management device 901 shown in FIG. 11 performs a calculation for naturally joining a plurality of encrypted tables A941 and B942. The encrypted table A941 shows the corresponding relation between each user name and corresponding card numbers, in which the first column is "user names" and the second column is "credit card numbers". The "credit card numbers" in the second column are encrypted by using the private key key 931*a*. The encrypted table B942 shows the expiration dates, in which the first column is "credit card numbers" and the second column is "credit card expiration dates". Further, the "credit card numbers" in the first column are encrypted by using the private key key' 931*b*.

When the administrator of the database wishes to know the corresponding relation between the "user names" and the "credit card expiration dates", the administrator issues a natural joining command text 971 by the encrypted table natural joining request unit 922 to naturally join the encrypted table A941 and the encrypted table B942 regarding the column "credit card numbers". By this processing, it is expected to acquire an encrypted table A×B981 which contains the "user names" in the first column, the "credit card numbers" in the second column, and the "credit card expiration dates" in the third column.

However, the encrypted table A941 and the encrypted table B942 are encrypted with the different private keys key 931*a* and key' 931*b*, so that the data thereof are different data because of the different encryption keys even the data at the stage of being in plain texts are the same data. Thus, the encrypted table natural joining unit 963 cannot use the encrypted data directly as the key for natural joining. In order to perform this processing, it is necessary to perform processing for decoding the column "credit card numbers" by the decoding function 963*a* shown in FIG. 14.

For the processing, the public keys pkey 972*a* and pkey' 972*b* corresponding to the respective private keys key 931*a* and key' 931*b* for the encrypted table A941 and the encrypted table B942 are required. By using the public keys, it is possible to decode the column "credit card numbers" for performing the processing. However, during the processing, the decoded plain text data is stored in the device, so that there may be a risk of having leakages of the plain text data during that time.

FIG. 18 is an explanatory chart regarding an example of performing a calculation for naturally joining an encrypted table C1001 and an encrypted table D1002 encrypted by utilizing key=key', i.e., the same encryption key "key" in order to overcome the foregoing issues. This encryption key may be of a public key type or of a common key type.

The encrypted table C1001 shows the corresponding relation between each user name and corresponding card numbers, in which the first column is "user names" and the second column is "credit card numbers". The "credit card numbers" in the second column are encrypted by using the encryption key "key". The encrypted table D1002 shows the expiration dates of each card, in which the first column is "credit card numbers" and the second column is "black list registered dates". Further, the "credit card numbers" in the first column are encrypted by using the same encryption key "key" as that of the table C1001.

When the encryption key "key" is the same, the data after being encrypted are the same provided that the data before being encrypted regarding the "credit card numbers" in the second column of the encrypted table C1001 and the "credit card numbers" in the first column of the encrypted table D1002 are the same. Therefore, it is possible to acquire an encrypted table C×D1003 by naturally joining the encrypted table C1001 and the encrypted table D1002 directly without utilizing the decoding function 963a. However, at the same time, this means that even an improper user who does not have the encryption key "key" can perform the processing for acquiring the encrypted table C×D1003 by naturally joining the encrypted table C1001 and the encrypted table D1002 regarding the encrypted data. This is not desirable for managing the encrypted database.

That is, desired is an encrypted database management device with which a plurality of tables regarding the encrypted data can be naturally joined by the user who has the proper encryption key without performing processing for decoding the encrypted data but with which the encrypted data cannot be naturally joined by illegitimate users who do not have the proper encryption key. In addition, it is also required to suppress a large increase in the calculation amount for performing the processing since the database handles a vast amount of data.

Each of the above-described Patent Documents and Non-Patent Documents are not designed to overcome such issue, so that techniques capable of overcoming such issue are not depicted therein naturally.

An object of the preset invention is to provide an encrypted database system, a client terminal, an encrypted database server, a natural joining method, and a program thereof, which are characterized to be capable of naturally joining a plurality of tables of an encrypted database regarding the encrypted data without performing processing for decoding each element of the data and without largely increasing the calculation amount.

DISCLOSURE OF THE INVENTION

In order to achieve the foregoing object, the encrypted database system according to the present invention is characterized as an encrypted database system constituted with a client terminal and an encrypted database server mutually connected to each other, wherein the client terminal includes: a recording module which records an encryption key in advance; a column encryption unit which encrypts data on an a-th column of a first table and data on a b-th column of a second table inputted from outside by using the encryption key, and outputs the encrypted data to the outside; and an encrypted table natural joining request unit which outputs a natural joining request text for requesting natural joining of the a-th column and the b-th column of the encrypted first table and second tables, generates a table joining key containing a column public key and a column private key generated by the encryption key from table identifiers of the first and the second tables and column identifiers of the a-th and b-th columns, and outputs the generated key by including it in the natural joining request text, and the encrypted database server includes: a data reception unit which receives and records the encrypted first and second tables; and an encrypted table natural joining unit which executes the natural joining of the encrypted first and second tables according to the natural joining request text by employing the table joining key.

In order to achieve the foregoing object, the client terminal according to the present invention is characterized as a client terminal constituting an encrypted database system by being mutually connected to an encrypted database server, and the client terminal includes: a recording module which records an encryption key in advance; a column encryption unit which encrypts data on an a-th column of a first table and data on a b-th column of a second table inputted from outside, and outputs the encrypted data to the outside; and an encrypted table natural joining request unit which outputs a natural joining request text for requesting natural joining of the a-th column and the b-th column of the encrypted first table and second tables, generates a table joining key containing a column public key and a column private key generated by the encryption key from table identifiers of the first and the second tables and column identifiers of the a-th and b-th columns, and outputs the generated key by including it in the natural joining request text.

In order to achieve the foregoing object, the encrypted database server according to the present invention is characterized as an encrypted database server constituting an encrypted database system by being mutually connected to a client terminal, and the encrypted database server includes: a data reception unit which receives and records the encrypted first and second tables; and an encrypted table natural joining unit which executes the natural joining of the encrypted first and second tables according to the natural joining request text by employing the table joining key.

In order to achieve the foregoing object, the natural joining method according to the present invention is used in an encrypted database system constituted with a client terminal and an encrypted database server mutually connected to each other, and the method is characterized that: an encryption key is stored in advance to a recording module of the client terminal; the recording module of the client terminal encrypts data on an a-th column of a first table and data on a b-th column of a second table inputted from outside by using the encryption key, and outputs the encrypted data to the outside; a data reception unit of the encrypted database server receives and records the encrypted first and second tables; an encrypted table natural joining request unit of the client terminal generates a table joining key containing a column public key and a column private key generated by the encryption key from table identifiers of the first and the second tables and column identifiers of the a-th and b-th columns; the encrypted table natural joining request unit of the client terminal outputs the table joining key by including it in a natural joining request text for requesting natural joining of the a-th column and the b-th column of the encrypted first table and second tables; an encrypted table natural joining unit of the encrypted database server executes the natural joining of the encrypted first and second tables according to the natural joining request text by employing the table joining key; and the encrypted table joining unit of the encrypted database server returns a result of the natural joining to the client terminal.

In order to achieve the foregoing object, the natural joining program according to the present invention is used in an encrypted database system constituted with a client terminal having an encryption key stored in advance and an encrypted database server mutually connected to each other, and the program is characterized to cause a computer provided to the client terminal to execute: a procedure for encrypting data on an a-th column of a first table and data on a b-th column of a second table inputted from outside by using the encryption key, and outputting the encrypted data to the outside; a procedure for generating a table joining key containing a column public key and a column private key generated by the encryption key from table identifiers of the first and the second tables and column identifiers of the a-th and b-th columns; and a procedure for outputting the table joining key by including it in a natural joining request text for requesting natural joining of the a-th column and the b-th column of the encrypted first table and second tables.

In order to achieve the foregoing object, the natural joining program according to the present invention is used in an encrypted database system constituted with a client terminal and an encrypted database server mutually connected to each other, and the program is characterized to cause a computer provided to the encrypted database server to execute: a procedure for receiving and recording the encrypted first and second tables from the client terminal; a procedure for executing the natural joining of the encrypted first and second tables according to the natural joining request text by employing the table joining key; and a procedure for returning a result of the natural joining to the client terminal.

The present invention is structured to generate the table joining key from the encryption key on the client terminal side and to transmit the natural joining request text containing it to the encrypted database server as described above. Thus, it is possible to judge whether or not the data of the column designated in the first table and the second table are equivalent only by the encrypted database server that has received the table joining key.

This makes it possible to provide the excellent encrypted database system, client terminal, encrypted database server, natural joining method, and program thereof, which are characterized to be capable of naturally joining a plurality of tables of an encrypted database regarding the encrypted data without performing processing for decoding each element of the data and without largely increasing the calculation amount.

BRIEF DESCRIPTION OF THE DRAWINGS

FIG. 15 is an explanatory chart showing an example of the table A before being encrypted in the encrypted database management device shown in FIG. 11;

FIG. 16 is an explanatory chart showing the encrypted table A in a state where the table A shown in FIG. 15 is encrypted by the column encryption unit shown in FIG. 11;

FIG. 17 is an explanatory chart showing an example of a case where the encrypted database management device shown in FIG. 11 performs a calculation for naturally joining a plurality of encrypted tables A and B; and FIG. 18 is an explanatory chart regarding an example where a calculation for naturally joining an encrypted table C and an encrypted table D encrypted by utilizing key=key', i.e., the same encryption key "key", in order to overcome the above-described issue.

BEST MODES FOR CARRYING OUT THE INVENTION

First Exemplary Embodiment

Figure 1:
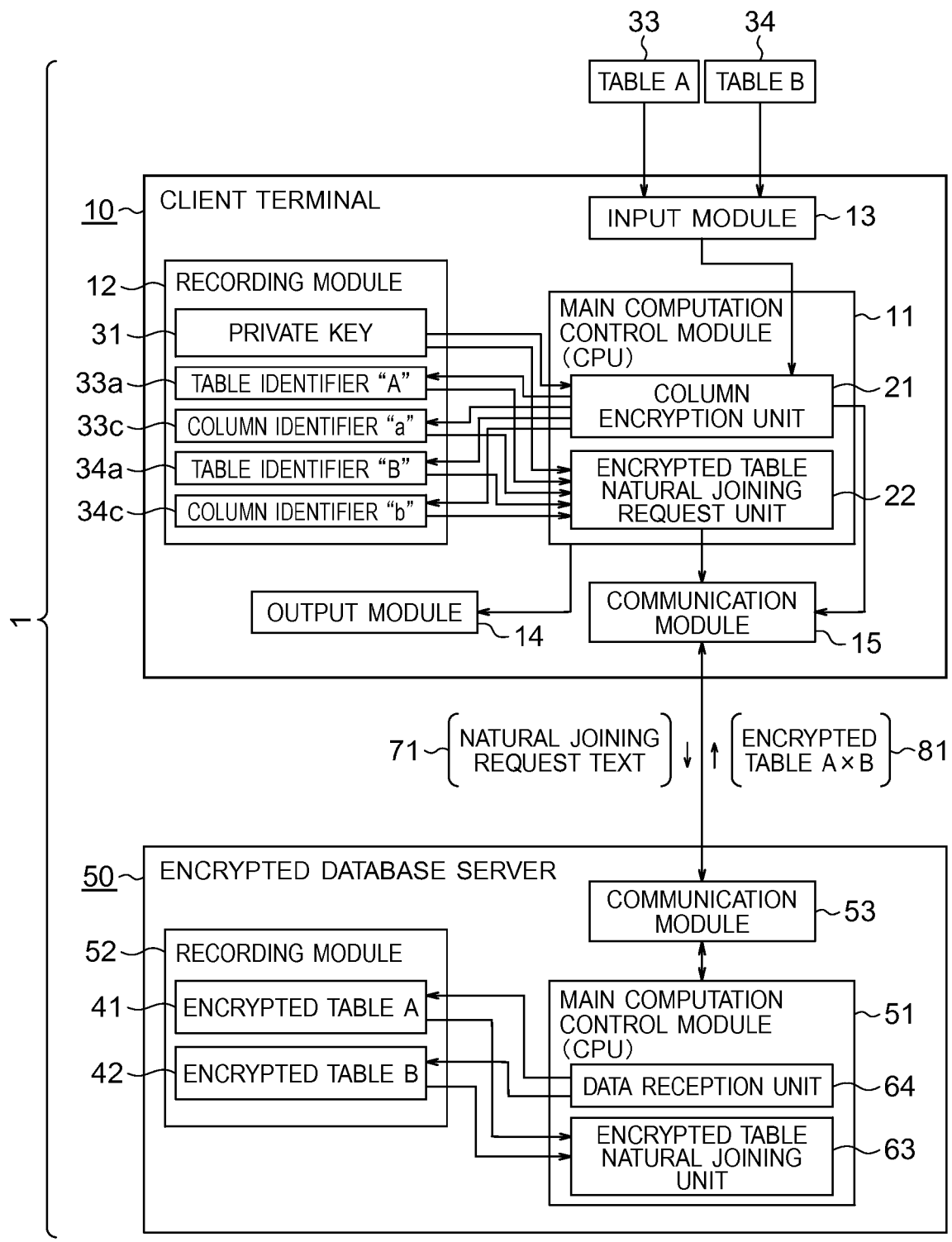
FIG. 1 is an explanatory chart showing the structure of an encrypted database system according to the present invention.

Hereinafter, the structure of a first exemplary embodiment according to the present invention will be described by referring to the accompanying drawings FIGS. 1, 3, 7, and 9. The basic contents of the exemplary embodiment will be described first, and more specific contents will be described thereafter.

An encrypted database system 1 according to the exemplary embodiment is constituted by mutually connecting a client terminal 10 and an encrypted database 50. The client terminal 10 includes: a recording module 12 which records an encryption key (private key 31) in advance; a column encryption unit 21 which encrypts the data in an a-th column of an inputted first table and the data in a b-th column of a second table by using the encryption key, and outputs those to outside; and an encrypted table natural joining request unit 22 which outputs a natural joining request text 71 for requesting natural joining of the a-th column and the b-th column of the encrypted first and second tables. Further, the encrypted table natural joining request unit 22 generates a table joining key that contains a column public key and a column private key generated by the encryption key from table identifiers of the first and second tables and column identifiers of the a-th column and the b-th column, and outputs it by including it in the natural joining request text 71. In the meantime, the encrypted database server 50 includes: a data reception unit 64 which receives and records the encrypted first and second tables; and an encrypted table natural joining unit 63 which executes natural joining of the encrypted first and second tables by employing the table joining key according to the natural joining request text.

Note here that the column encryption unit 21 of the client terminal includes: a column private key generating function 21a which generates a column private key x[a] of the a-th column from the encryption key (private key 31), a table identifier 33a of the first table (table A33), and a column identifier 33c of the a-th column; a column public key generating function 21b which generates a column public key g[a] of the a-th column which corresponds to the column private key of the a-th column from the table identifier of the first table and the column identifier of the a-th column; a comparison value generating function 21c which generates comparison values from each component of the a-th column of the first table and the encryption key; a concealed comparison value generating function 21d which generates concealed comparison values from each of the comparison values, the encryption key, and the column private key as well as the column public key of the a-th column; an encrypting function 21e which encrypts the data in the a-th column by the encryption key to generate a ciphertext; and a table update function 21f which encrypts the first table by replacing the data in the a-th column with the ciphertext and the concealed comparison value, and transmits the encrypted first table to the encrypted database server. Further, the column encryption unit 21 also generates a column private key x[b] and a column public key x[b] for the b-th column of the second table (table B34) as well, and performs processing for generating the comparison values, the concealed comparison values, and the ciphertext from those to encrypt the second table and for transmitting it to the encrypted database server. Furthermore, the column encryption unit 21 includes a random number generating function 21g which generates random numbers that correspond to each component in the a-th column. The concealed comparison value generating function 21d generates the concealed comparison values from each of the comparison values, the encryption key, the column private key as well as the column public key of the a-th column, and the random numbers.

Further, the encrypted table natural joining request unit 22 of the client terminal includes: a table joining key generating function 22c which generates a table joining key from a table identifier of the first table, a column identifier of the a-th column, a table identifier 34a of the second table, a column identifier 34c of the b-th column, and the encryption key; and a natural joining request text output function 22d which outputs the natural joining request text 71 from the table identifier of the first table, the column identifier of the a-th column, the table identifier of the second table, the column identifier of the b-th column, and the table joining key, and transmits it to the encrypted database server. The table joining key contains the column public key g[a] to the power of the column private key x[b] and the column public key g[b] to the power of the column private key x[a] as the elements. Further, the encrypted table natural joining request unit 22 includes a column private key generating function 22a and a column public key generating function 22b same as those of the column encryption unit.

Further, an encrypted table natural joining unit 63 of the encrypted database server includes: a common comparison value generating function 63a which generates a first common comparison value by using the element of the column public key g[b] of the table joining key to the power of the column private key x[a] from the concealed comparison value of the a-th column of the encrypted first table and generates a second common comparison value by using the element of the column public key g[a] of the table joining key to the power of the column private key x[b] from the concealed comparison value of the b-th column of the encrypted second table; a concealed comparison value update function 63b which replaces the concealed comparison value of the a-th column of the encrypted first table with the first common comparison value and replaces the concealed comparison value of the b-th column of the encrypted second table with the second common comparison value; and a natural joining function 63c which executes natural joining regarding the a-th column and the b-th column of the replaced first and second table according to the natural joining request text, and returns the result thereof to the client terminal.

Through providing the above-described structure, it is possible with the encrypted database system 1 to perform natural joining of the encrypted data without performing processing for decoding each element of the data and without largely increasing the calculation amount. This will be described in more details.

(Regarding Symbols, Terms, and Definitions Thereof)

First, symbols, terms, and definitions thereof used in this Description will be described. In lines other than numerical expressions in this Description, "A with superscript B (A to the power of B, for example)" is expressed as "A^B", and "A with subscript B" is expressed as "A_B".

Note that "p" is a prime number. "G" and "G_T" are a cyclic group, each having the order "p", and "pair" is bilinear mapping of G and G to G_T. "Hash" is mapping from a character string of an arbitrary length to Z/pZ and is a Hash function, for example, and "enc" is an encryption function by having a key and a plain text as input and a ciphertext as output.

Each table of the database has an identifier that uniquely identifies itself. Each column of each table of the database has an identifier that uniquely identifies itself in the belonging table. Each column taken out from each table of the database is referred to as a column vector. To perform equi-joining of the table A and the table B of the database under a condition that "the element of the column a of the table A and the element of the column b of the table B are equivalent" is expressed as "to perform natural joining of the table A and the table B regarding the column a of the table A and the column b of the table B". Note here that the duplicating columns are omitted when performing the equi-joining.

FIG. 1 is an explanatory chart showing the structure of the encrypted database system 1 according to the present invention. The encrypted database system 1 is constituted by mutually connecting the client terminal 10 and the encrypted database server 50 via LAN (Local Area Network) or the like.

The client terminal 10 has the structure as a typical computer device. That is, the client terminal 10 includes: the main computation control module (CPU: Central Processing Unit) 11 as the main unit for executing computer programs; the recording module 12 for recording data; the input module 13 which accepts operations from the user; the output module 14 which presents processing results to the user; and the communication module 15 which performs data communications with other computers.

In the main computation control unit 11, the column encryption unit 21 and the encrypted table natural joining request unit 22 are structured to execute respective functions to be described later as each of the computer programs in response to operation commands from the user. Further, the private key (key) 31 used in the processing to be described later is stored in the recording module 12. Further, the table A33 and the table B34 are inputted to the input module 13.

The encrypted database server 50 also has the structure as a typical computer device. That is, the encrypted database server 50 includes: a main computation control module (CPU: Central Processing Unit) 51 as the main unit for executing computer programs; a recording module 52 for recording data; and a communication module 53 which performs data communications with other computers.

In the main computation control unit 51, the encrypted table natural joining unit 63 and the data reception unit 64 are structured to execute respective functions to be described later as each of the computer programs in response to operation commands from the client terminal 10. Further, an encrypted table A41 and an encrypted tale B42 acquired by encrypting the respective tables A33 and B34 received from the client terminal 10 by the data reception unit 64 are stored in the recording module 52.

As the encryption key used in the client terminal 10, it is possible to use a common key that is used in common for encryption and decoding. However, it is desirable to use a private key of a public key encryption type in view of the security. Thus, the private key (key) 31 is used in this exemplary embodiment. The private key (key) 31 is not transmitted to other devices from the client terminal 10. Further, a public key corresponding to the private key (key) 31 is not used in this exemplary embodiment.

Note here that it is not specifically required to follow this case regarding physical divisions of the computer devices. For example, the column encryption unit 21 and the encrypted table natural joining request unit 22 may be operated by computers different from each other. Furthermore, the column encryption unit 21, the encrypted table natural joining request unit 22, and the encrypted table natural joining unit 63 may all be operated by a same computer.

Figure 2:
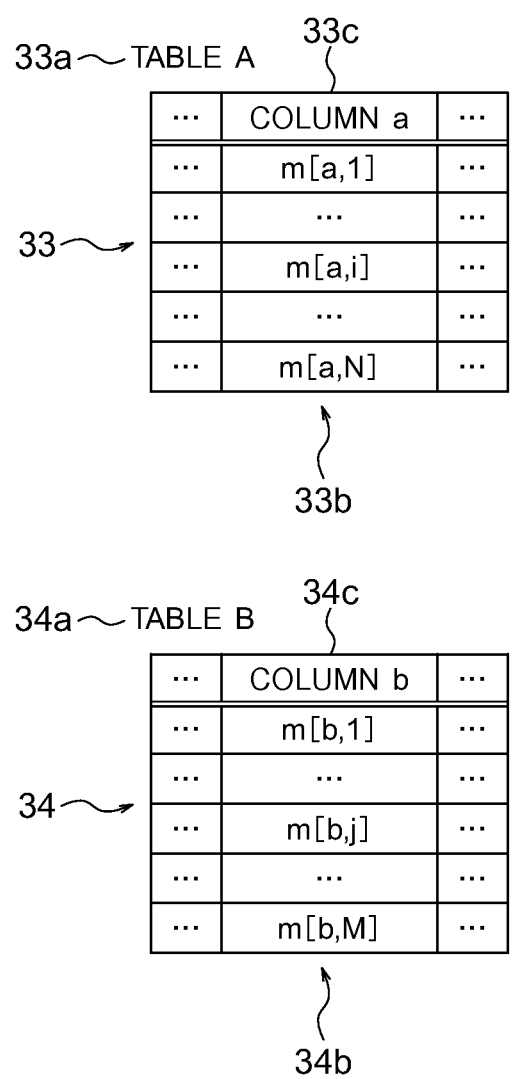
FIG. 2 is an explanatory chart for describing a table A and a table B shown in FIG. 1 in more details.

FIG. 2 is an explanatory chart for describing the table A and the table B shown in FIG. 1 in more details. Each table has a table identifier given to the entire table and a column identifier given to column data of a specific column and the column thereof.

Here, it is so defined that the table identifier 33a of the table A33 is "A", the a-th column data 33b as a target of the encryption in the table A33 and the key for natural joining is m[a, i] (the number of rows in the table A33 is N, and i is a natural number satisfying 1≤i≤N), and the column identifier 33c of the a-th column is "a". Hereinafter, this column is simply referred to as "column a". Further, it is so defined that the table identifier 34a of the table B34 is "A", the b-th column data 34b as a target of the encryption in the table B34 and the key for natural joining is m[b, j] (the number of rows in the table B34 is M, and j is a natural number satisfying 1≤j≤M), and the column identifier 34c of the b-th column is "b". Hereinafter, this column is simply referred to as "column b".

(Column Encryption Unit)

Figure 3:
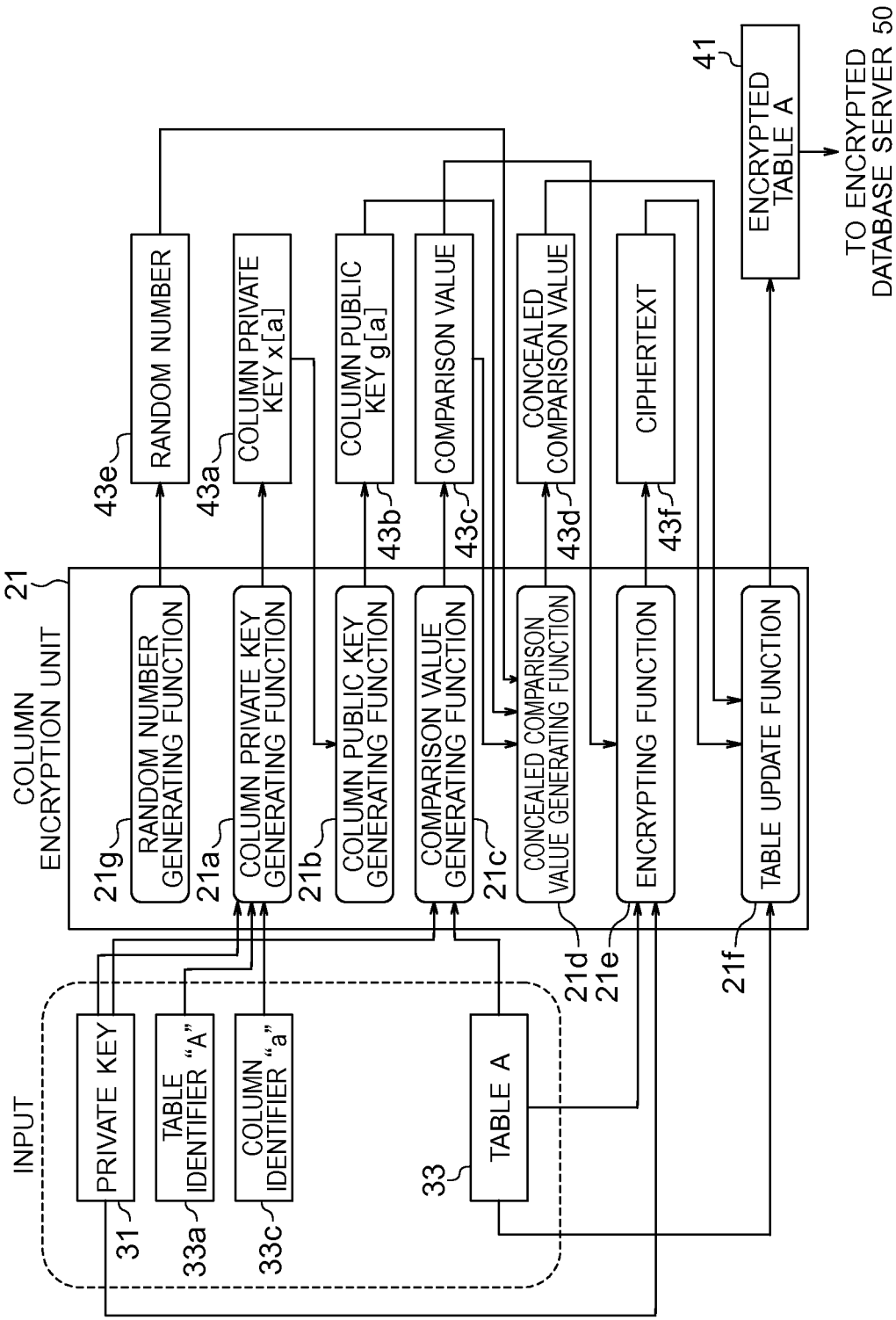
FIG. 3 is an explanatory chart showing the more detailed structures of a client terminal shown in FIG. 1 as a column encryption device.

FIG. 3 is an explanatory chart showing the more detailed structures of the client terminal 10 shown in FIG. 1 as the column encryption device. The client terminal 10 functions as the column encryption device for encrypting the column a of the table A when the column encryption unit 21 operates by the main computation control module 11. The column encryption unit 21 includes the column private key generating function 21a, the column public key generating function 21b, the comparison value generating function 21c, the concealed comparison value generating function 21d, the encrypting function 21e, the table update function 21f, and the random number generating function 21g. Details of each of those functions will be described later.

As the input data to the column encryption unit 21, the private key (key) 31 is stored in the recording module 12. The table A33 shown in FIG. 2 is inputted from the input module 13. Only the processing for the table A33 is described with FIG. 3, so that the table B34 and the elements related thereto are not illustrated.

Figure 4:
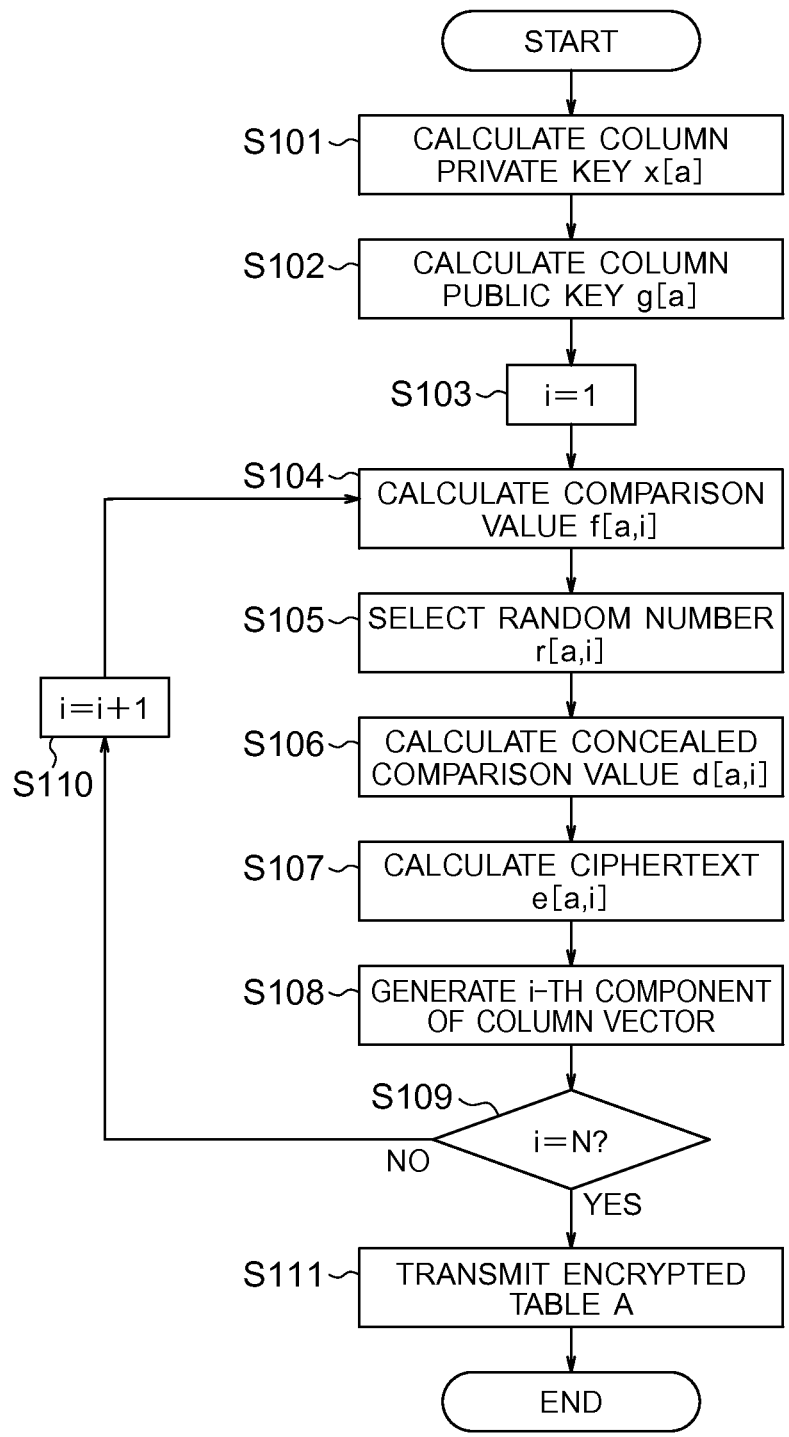
FIG. 4 is a flowchart showing processing done by a column encryption unit shown in FIG. 3.

FIG. 4 is a flowchart showing the processing done by the column encryption unit 21 shown in FIG. 3. The column private key generating function 21a calculates a column private key $43a = x[a]$ by using Expression 1 shown below from the private key (key) 31, the table identifier $33a = $ "A", and the column identifier $33c = $ "a" (step S101).

$$\text{Column pruivate key } x[a] = \text{Hash}(\text{"secret"}, \text{key}, A, a) \quad \text{(Expression 1)}$$

The column public key generating function 21b calculates a column public key $43b = g[a]$ which corresponds to the column private key $43a = x[a]$ by using Expression 2 shown below (step S102).

$$\text{Column pubic key } g[a] = \text{Hash}(\text{"public"}, A, a) \quad \text{(Expression 2)}$$

Note here that a first variable "secret" and "public" of the Hash function on the right side of Expression 1 and Expression 2 are merely character strings, which are used for distinguishing the usage of the Hash function within the device of the client terminal 10. Therefore, any character strings may be employed as long as the usage can be distinguished therewith within the device. This is also the same for the Hash function hereinafter.

Note that i=1 is defined as an initial value (step S103), and the comparison value generating function 21c calculates a comparison value $43c = f[a, i]$ regarding the i-th component m[a, i] of the column a33b by using Expression 3 shown below (step S104).

$$\text{Comparison value } f[a,i] = \text{Hash}(\text{"value"}, \text{key}, m[a,i]) \quad \text{(Expression 3)}$$

The random number generating function 21g generates a random number $43e = r[a, i]$ that is selected randomly from Z/qZ (step S105). The concealed comparison value generating function 21d calculates a concealed comparison value $43d = d[a, i]$ by utilizing the random number $43e = r[a, i]$ and the comparison value $43c = f[a, i]$ by using Expression 4 shown below (step S106).

$$\text{Concealed comparison value } d[a, i] = \left( g[a]^{\left(\frac{f[a,i]}{r[a,i]+x[a]}\right)}, r[a, i] \right) \quad \text{(Expression 4)}$$

The encrypting function 21e calculates a ciphertext $43f = e[a, i]$ by utilizing the i-th component m[a, i] of the column a33b and the private key (key) 31 by using Expression 5 shown below. Note here that r'[a, i] is a random number selected randomly (step S107).

$$\text{Ciphertext } e[a,i] = (\text{enc}(\text{key}, (r'[a,i], m[a,i])), r'[a,i]) \quad \text{(Expression 5)}$$

The table update function 21f generates the i-th component of the column vector (e[a, i], d[a, i]) by utilizing the ciphertext $43f = e[a, i]$ and the concealed comparison value $43d = d[a, i]$ (step S108, this column vector is referred to as an encrypted column vector 41b hereinafter). Thereafter, i is incremented by 1, and the processing of steps S103 to S108 is repeated until it reaches i=N (steps S109 to 110).

At last, the table update function 21f outputs the table A33 in a state where i=N and the row a is replaced with the encrypted column vector 41b as an encrypted table A41, and transmits it to the encrypted database server 50 via the communication module 15 (step S111). At the same time, the table update function 21f records the table identifier 33a="A" and the column identifier 33c="a" to the recording module 12. The data reception unit 64 of the encrypted database server 50 records the encrypted table A41 received via the communication module 53 to the recording module 52.

Figure 5:
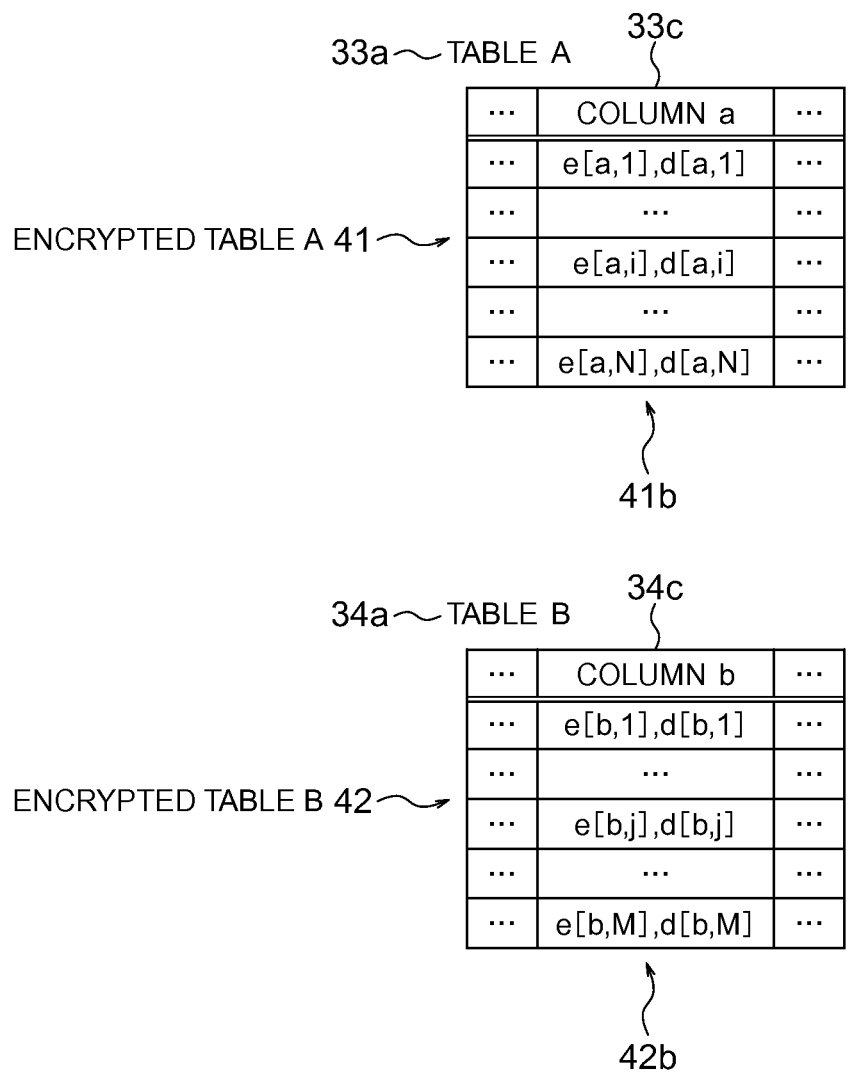
FIG. 5 is an explanatory chart showing an encrypted table A outputted by the processing shown in FIG. 4.

FIG. 5 is an explanatory chart showing the encrypted table A41 outputted by the processing shown in FIG. 4. Compared to the table A33 before being encrypted shown in FIG. 2, the column data 33b=m[a, i] (the number of rows in the table A33 is N, and i is a natural number satisfying 1≤i≤N) of the column a is replaced with the encrypted column vector 41b=(e[a, i], d[a, i]). The table identifier 33a="A" and the column identifier 33c="a" of the column a are kept without being encrypted.

The data of the table A33 is transmitted to the encrypted database server 50 as the encrypted table A41 that is in a state where the column data 33b is being encrypted, and it is stored inside the encrypted database server 50 in that state. Even the administrator of the encrypted database server 50 cannot release the encryption of the encrypted table A41 unless the encryption key (the public key corresponding to the private key (key) 31 in this exemplary embodiment) capable of releasing the encryption is separately transmitted to the encrypted database server 50. That is, the secrecy of the data on the client terminal 10 side can be secured even if there is an ill will on the encrypted database server 50 side.

The column encryption unit 21 also encrypts the column b for the table B34 in the same manner as that of the processing done for the table A33 to replace the column data 34b=m[b, j] (the number of rows in the table A33 is M, and j is a natural number satisfying 1≤j≤N) of the column b with the encrypted column vector 42b=(e[b, j], d[b, j]), and transmits it as the encrypted table B42 to the encrypted database server 50 via the communication module 15. Then, the table identifier 34a="B" and the column identifier 34c="b" are stored to the recording module 12.

In the processing shown in Expression 3 and Expression 5 for calculating the comparison value and the ciphertext for the column data 34b=m[b, j] of the column b, the same private key (key) 31 used for calculation of the column data 33b=m[a, i] of the column a is used. However, as will be described later, even if there is a value satisfying m[b, j]=m[a, i], the issue explained in FIG. 18 of the section describing the issue to be overcome by the present invention does not occur since the comparison values and the ciphertexts acquired therefrom are of different values.

Figure 6:
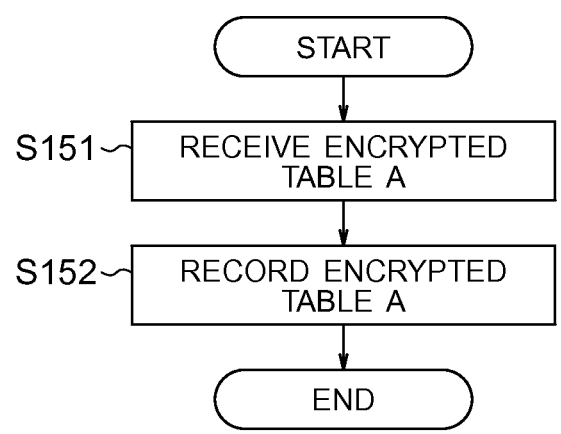
FIG. 6 is a flowchart showing actions of a data reception unit shown in FIG. 1 done on the encrypted database server side that has received the encrypted table A transmitted in step S111 of FIG. 4.

FIG. 6 is a flowchart showing actions of the data reception unit 64 shown in FIG. 1 on the encrypted database server 50 side that has received the encrypted table A41 transmitted in step S111 of FIG. 4. When the data reception unit 64 receives the encrypted table A41 via the communication module 53 (step S151), the encrypted table A41 is stored to the recording module 52 (step S152).

In a case where the data reception unit 64 receives the encrypted table B42, the received encrypted table B42 is also stored to the recording module 52 in the same manner. Actions of the client terminal 10 and the encrypted database server 50 to be described later are executed on the assumption that the encrypted table A41 and the encrypted table B42 are already stored to the recording module 52.

(Encrypted Table Natural Joining Request Unit)

Figure 7:
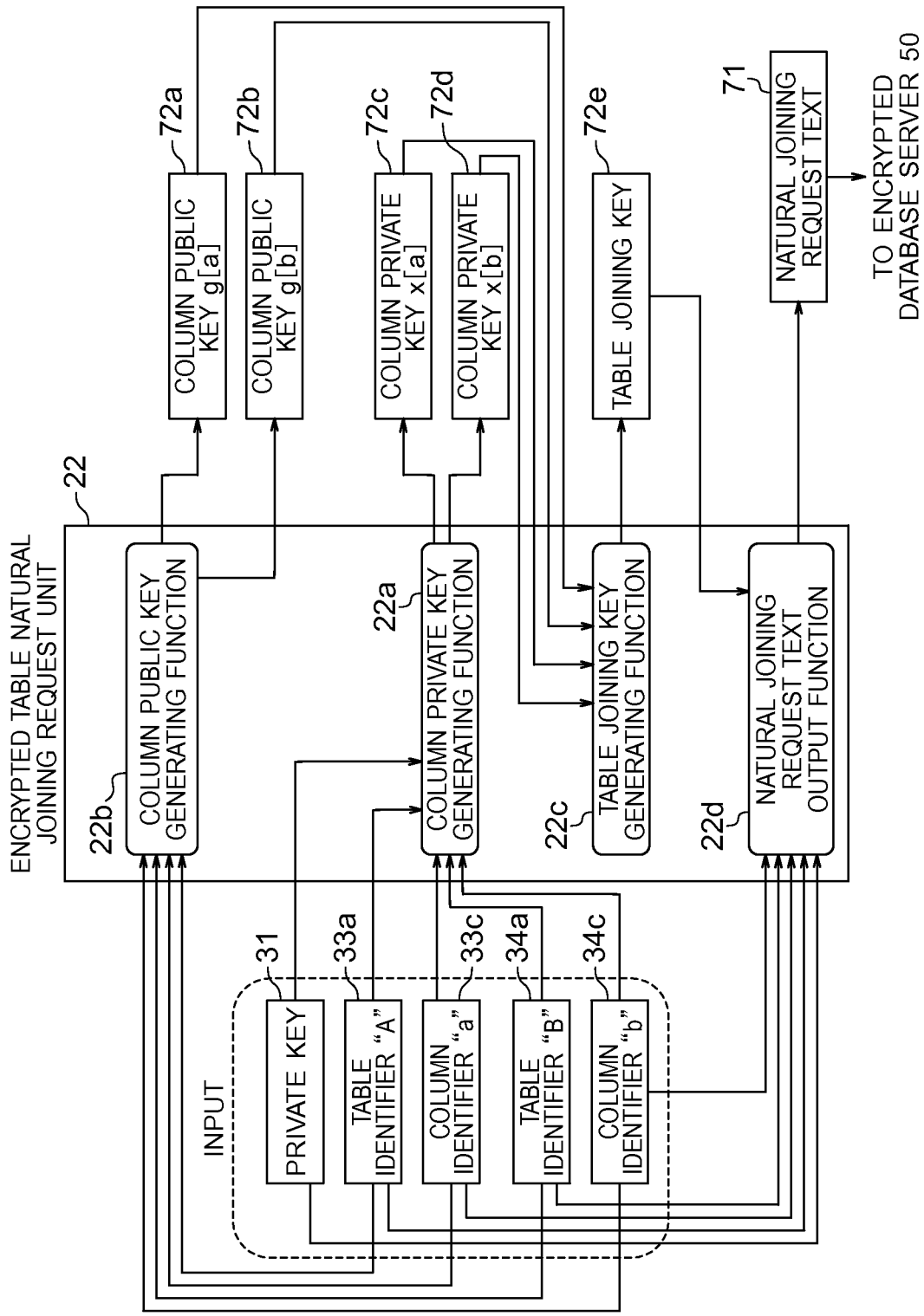
FIG. 7 is an explanatory chart showing the more detailed structure of the client terminal shown in FIG. 1 as an encrypted table natural joining request device.

FIG. 7 is an explanatory chart showing the more detailed structure of the client terminal 10 shown in FIG. 1 as the encrypted table natural joining request device. The client terminal 10 functions as the encrypted table natural joining request device which generates the natural joining request text 71 for naturally joining the encrypted table A41 and the encrypted table B42 encrypted by the column encryption unit 21 regarding the column a and the column b, and transmits it to the encrypted database server 50 through operating the encrypted table natural joining request unit 22 by the main computation control module 11.

The encrypted table joining request unit 22 includes the column private key generating function 22a, the column public key generating function 22b, the table joining key generating function 22c, and the natural joining request text output function 22d. Details of each of those functions will be described later.

As the input data to the encrypted table natural joining request unit 22, the private key (key) 31, the table identifier 33a="A" of the encrypted table A41 shown in FIG. 5, the column identifier 33c="a", the table identifier 33a="B" of the encrypted table B42, and the column identifier 33c="b" are stored to the recording module 12. Other data of the encrypted table A41 and the encrypted table B42 are not used herein.

Figure 8:
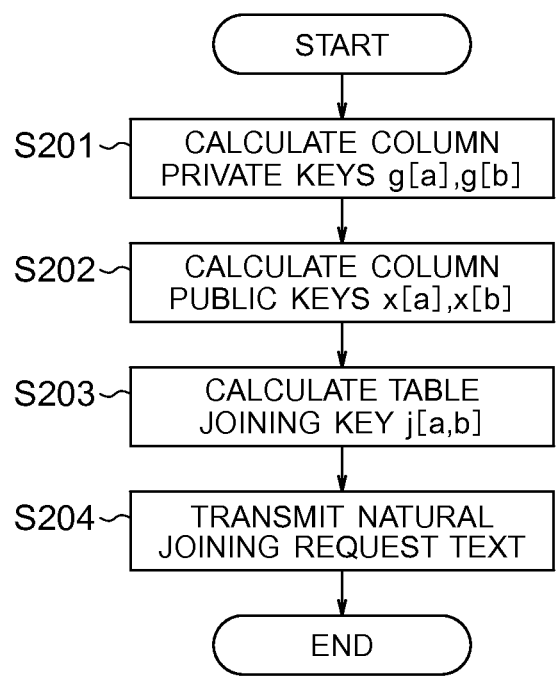
FIG. 8 is a flowchart showing processing of an encrypted table natural joining request unit show in FIG. 7.

FIG. 8 is a flowchart showing the processing of the encrypted table natural joining request unit 22 shown in FIG. 7. The column public key generating function 22b calculates a column public key g[a] 72a of the column a and a column public key g[b] 72b of the column b by calculations shown in Expression 6 and Expression 7 from the table identifiers 33a, 34a of the encrypted tables A41, B42 and the column identifiers 33c, 34c of the columns a, b (step S201).

Column public key $g[a]$=Hash("public",$A,a$)  (Expression 6)

Column public key $g[b]$=Hash("public",$B,b$)  (Expression 7)

The column private key generating function 22a calculates a column private key x[a] 72c of the column a and a column private key x[b] 72d of the column b corresponding, respectively, to the column public key g[a] 72a and the column public key g[b] 72b by calculations shown in Expression 8 and Expression 9 below from the private key (key) 31, the table identifier 33a of the tables A33, B34, and the column identifier 33c of the columns a, b (step S202).

Column private key $x[a]$=Hash("secret",key,$A,a$)  (Expression 8)

Column private key $x[b]$=Hash("secret",key,$B,b$)  (Expression 9)

The functions and actions of the column private key generating function 22a and the column public key generating function 22b of the encrypted table natural joining request unit 22 are the same as those of the column private key generating function 21a and the column public key generating function 21b of the column encryption unit 21. The column public keys and the column private keys 72a to 72d generated by the encrypted table natural joining request unit 22 are also the same as the column public key 43a and the column private key 43b generated by the encryption unit 21. Therefore, when the column encryption unit 21 and the encrypted table natural joining request unit 22 operate in a same computer, the column private key generating function 21a (22a) and the column public key generating function 21b (22b) can be achieved by a common module.

Further, the column public key and the column private key generated through the actions of the column encryption and the natural joining request can be used in common. However, to keep the region which records the column public key and the column private key over a long period of time on the storage region 12 is not preferable in view of the security. Thus, in this exemplary embodiment, the column public key and the column private key are generated every time each action of the encryption and the natural joining request is done.

The table joining key generating function 22c calculates a table joining key j[a, b] 72e constituted with an element J_1 shown in Expression 10 and an element J_2 shown in Expression 11 from each of the column public keys and column private keys 72a to 72d as in Expression 12 shown below (step S203).

$$J_1[a,b]=(j[a,b,1],j[a,b,3])=(g[a],g[a]^{x[b]}) \quad \text{(Expression 10)}$$

$$J_2[a,b]=(j[a,b,2],j[a,b,4])=(g[b],g[b]^{x[a]}) \quad \text{(Expression 11)}$$

$$\text{Table joining key } j[a,b]:=(J_1[a,b],J_2[a,b]) \quad \text{(Expression 12)}$$

The natural joining request text output function 22d outputs the natural joining request text 71 shown in following A13 and transmits it to the encrypted database server 50 from the calculation results acquired heretofore (step S204). The data reception unit 64 of the encrypted database server 50 drives the encrypted table natural joining unit 63 to execute the action of natural joining to be described later upon receiving the natural joining request text 71.

$$\text{Natural joining request text}=(\text{"natural joining"},A,a,B,b,j[a,b]) \quad \text{(Expression 13)}$$

(Encrypted Table Natural Joining Unit)

Figure 9:
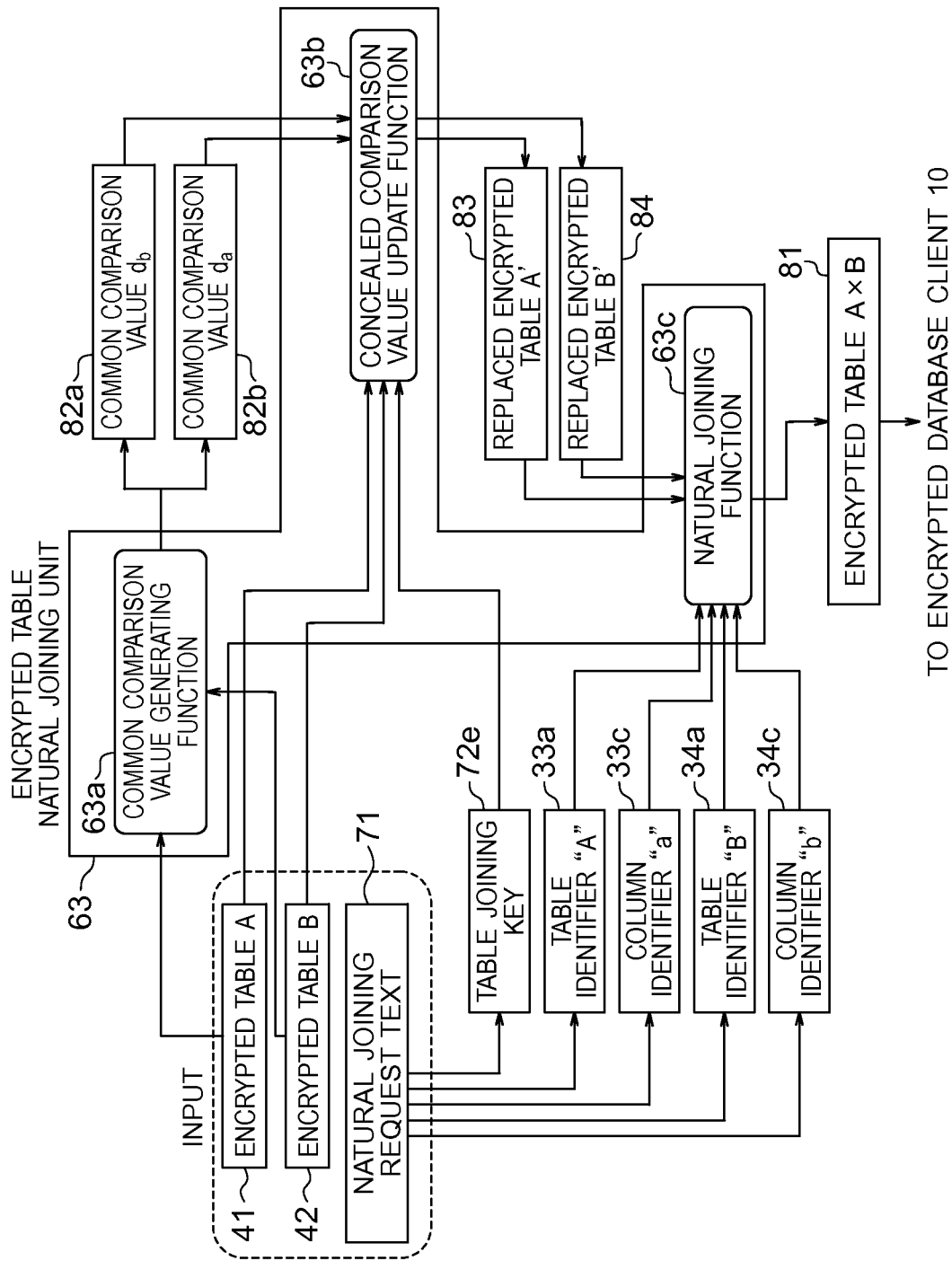
FIG. 9 is an explanatory chart showing the more detailed structure of the encrypted database server shown in FIG. 1 as an encrypted table natural joining device.

FIG. 9 is an explanatory chart showing the more detailed structure of the encrypted database server 50 shown in FIG. 1 as the encrypted table natural joining device. The encrypted database server 50 functions as the encrypted table natural joining device which naturally joins the encrypted tables A41 and B42 encrypted by the column encryption unit 21 of the client terminal 10 regarding the column a and the column b according to the natural joining request text 71 issued by the encrypted table natural joining request unit 22 and outputs and returns the encrypted table A×B81 to the client terminal 10, when the encrypted table natural joining unit 63 is operated by the main computation control module 51.

The encrypted table natural joining unit 63 includes a common comparison value generating function 63a, a concealed comparison value update function 63b, and a natural joining function 63c. Details of each of those functions will be described later.

As the input data to the encrypted table natural joining unit 63, the encrypted table A41 and the encrypted table B42 received from the column encryption unit 21 of the client terminal 10 are stored to the recording module 52. The natural joining request text 71 issued by the encrypted table natural joining request unit 22 of the client terminal 10 are received via the communication module 53 and inputted to the encrypted table natural joining unit 63. As described above, the natural joining request text 71 contains each of the matrix, the identifier of the encrypted column, and the table joining key j[a, b].

Figure 10:
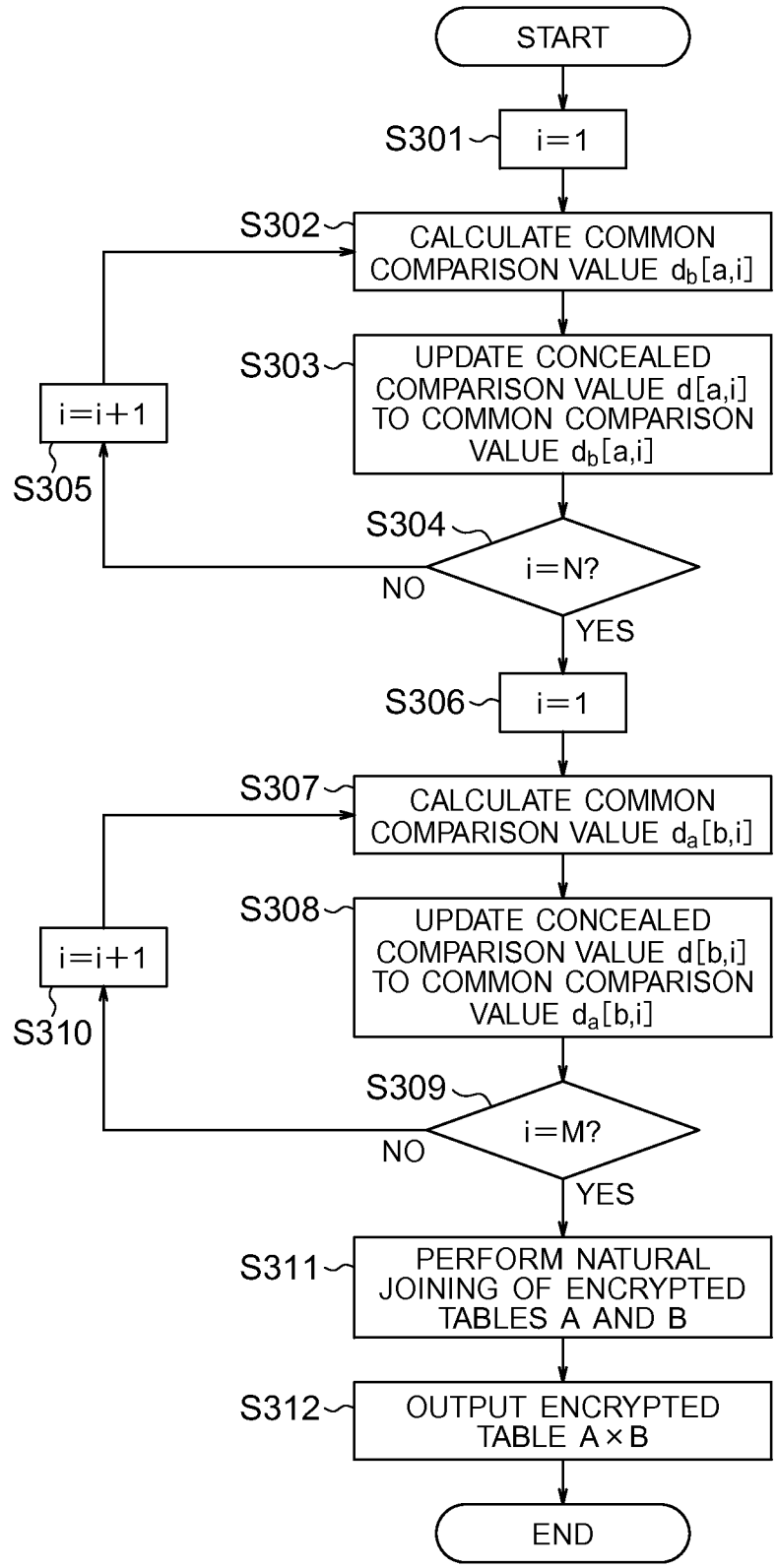
FIG. 10 is a flowchart showing processing of an encrypted table natural joining unit show in FIG. 9.
Figure 11:
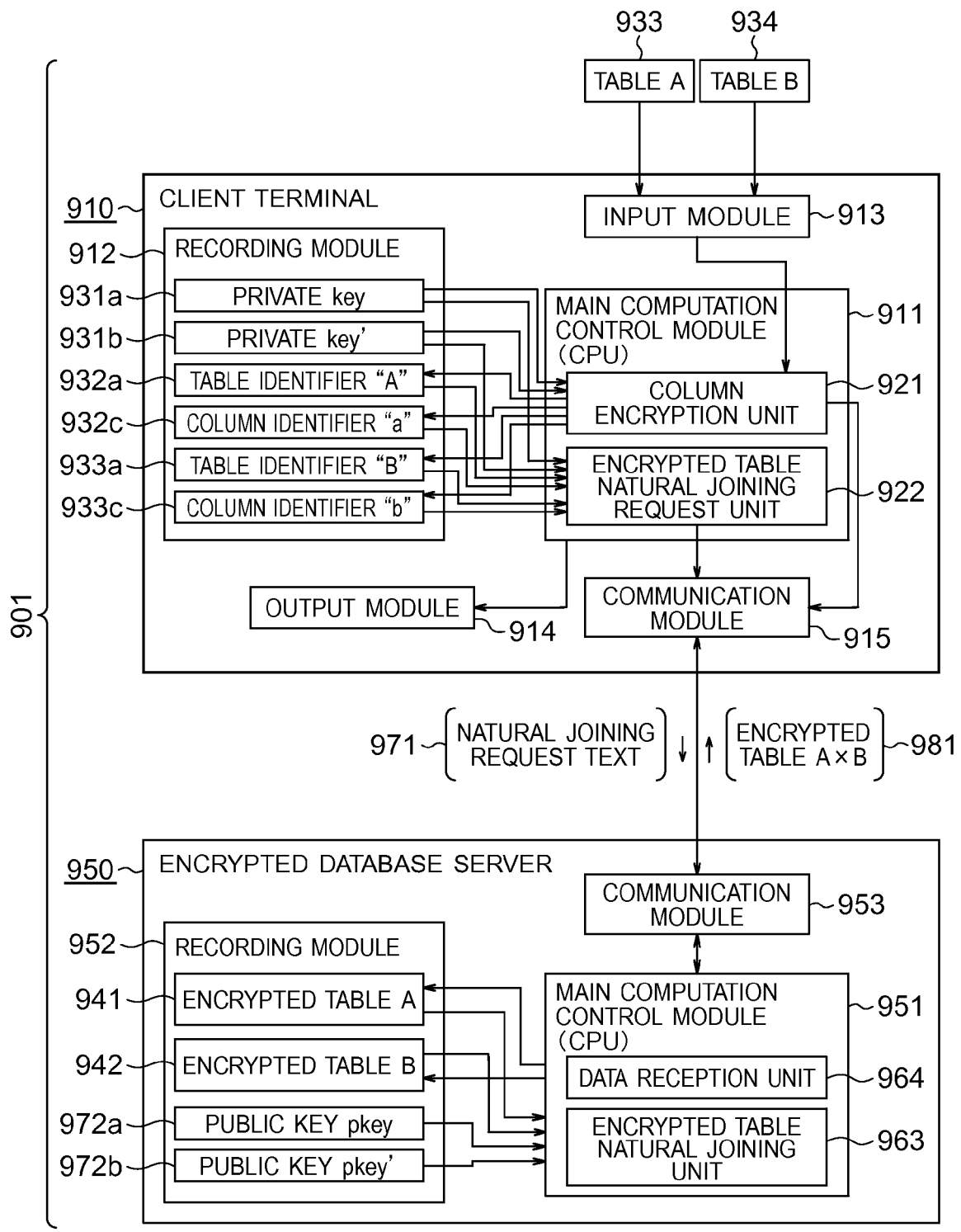
FIG. 11 is an explanatory chart showing the structure of an encrypted database system according to a typical technique regarding an encrypted database.
Figure 12:
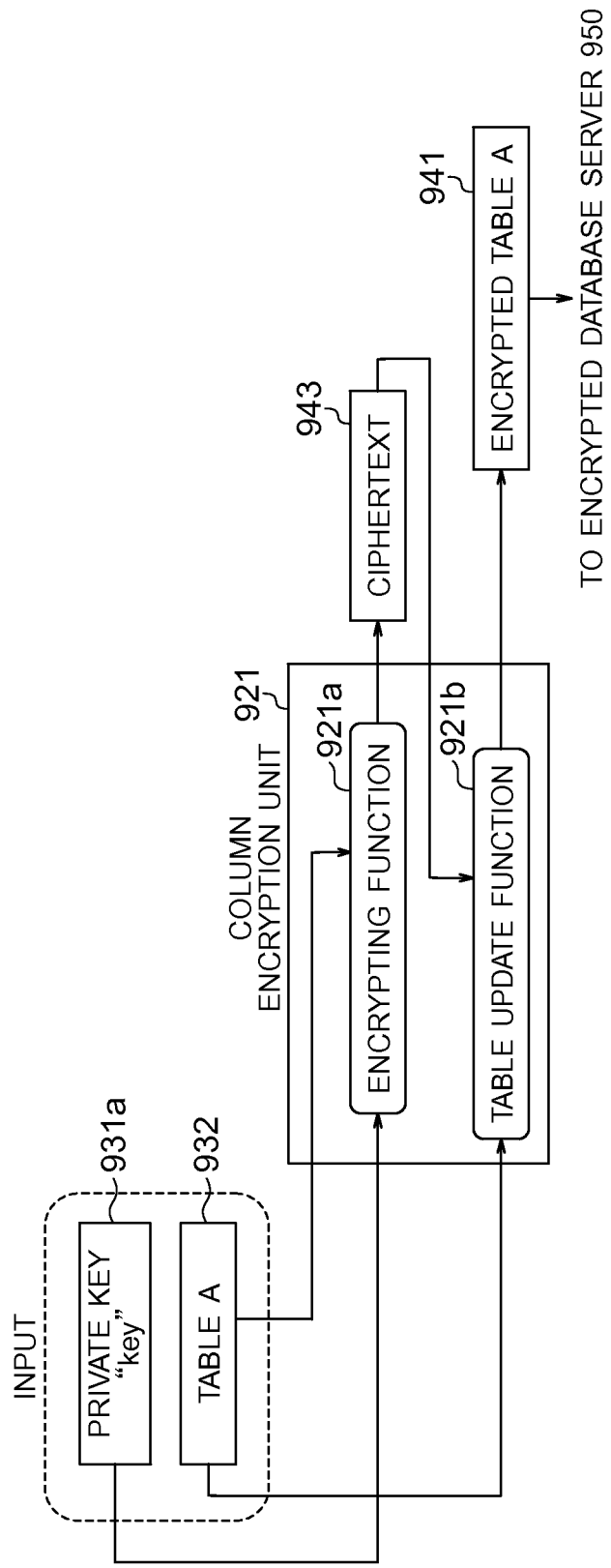
FIG. 12 is an explanatory chart for more specifically describing functions of a column encryption unit shown in FIG. 11.
Figure 13:
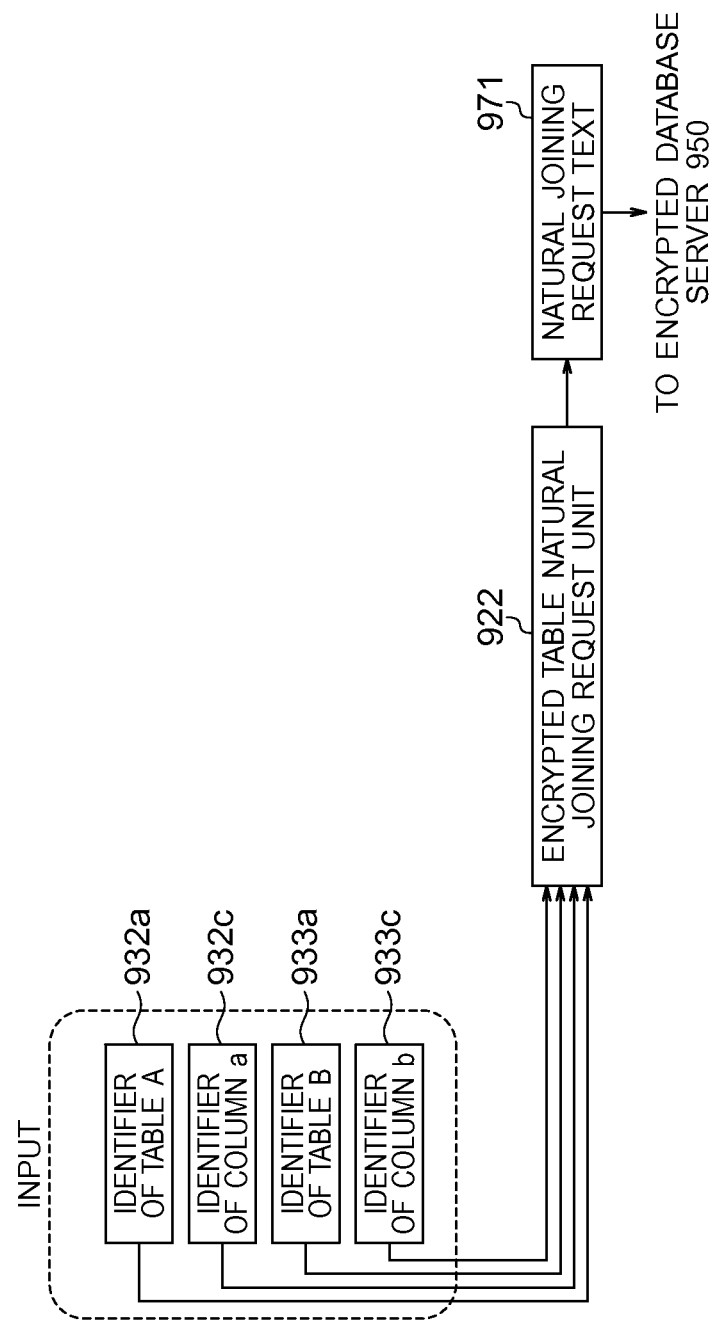
FIG. 13 is an explanatory chart for more specifically describing functions of an encrypted table natural joining request unit shown in FIG. 11.
Figure 14:
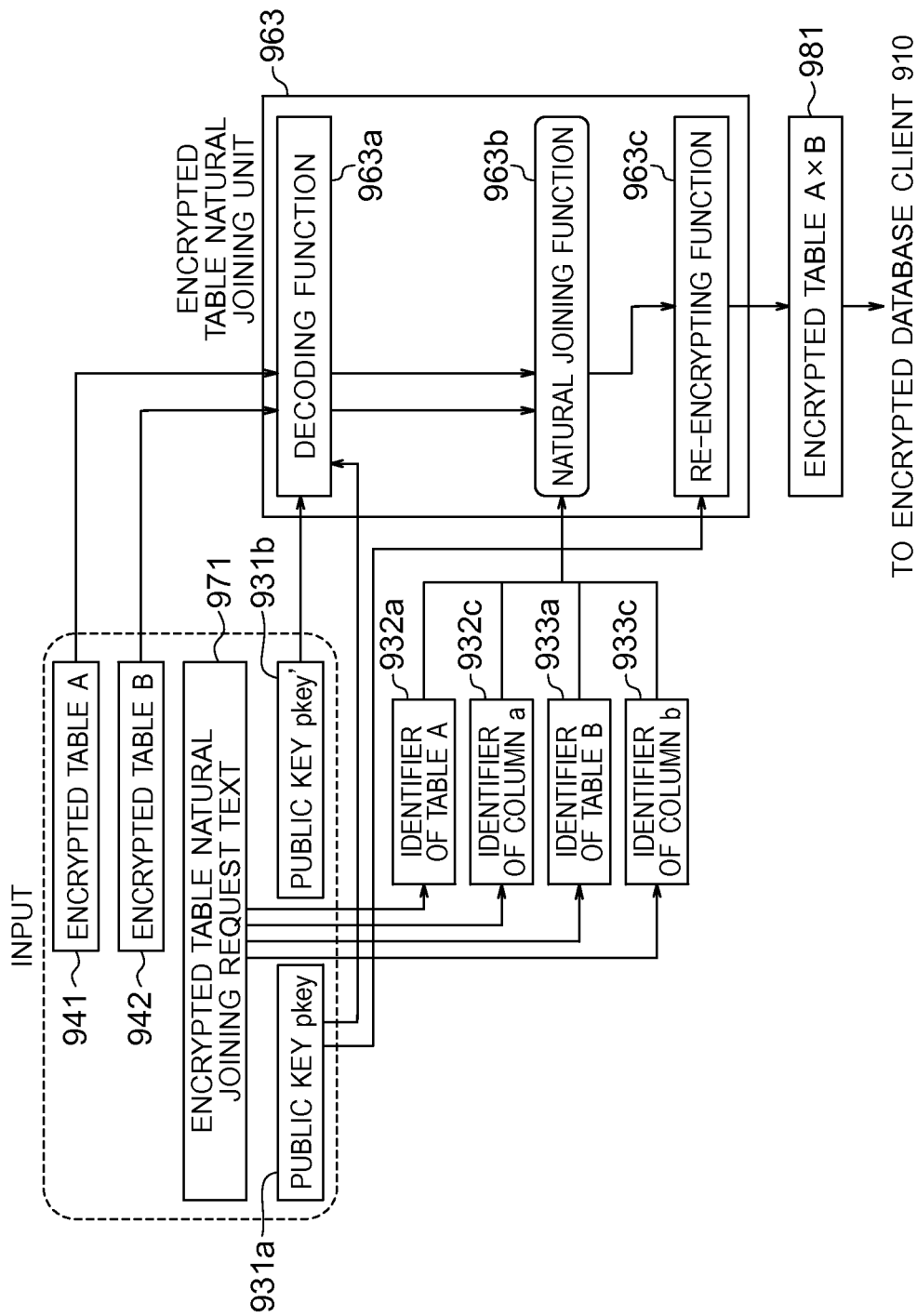
FIG. 14 is an explanatory chart for more specifically describing functions of an encrypted table natural joining unit shown in FIG. 11.

FIG. 10 is a flowchart showing the processing of the encrypted table natural joining unit 63 shown in FIG. 9. As the initial value, i=1 is defined (step S301). The common comparison value generating function 63a calculates a common comparison value d_b[a, i] 82a shown in Expression 15 from each of the i-th components d[a, i] of the column a of the encrypted table A41 and the table joining key j[a, b] shown in following Expression 14 (equivalent to Expression 11 to 13) (step S302).

$$\text{Table joining key } j[a,b]:=(j[a,b,1],j[a,b,2],j[a,b,3],j[a,b,4]) \quad \text{(Expression 14)}$$

$$\text{Common comparison value } d_b=\text{pair}(d[a,i],j[a,b,2])^{r[a,i]} \cdot j[a,b,4]) \quad \text{(Expression 15)}$$

The concealed comparison value update function 63b replaces each of the i-th components of the concealed comparison values d[a, i] of the column a of the encrypted table A41 with the d_b[a, i] to acquire a replaced table A' 83 (step S303). Thereafter, i is incremented by 1, and the processing of steps S302 to 303 is repeated until i reaches the number of rows "N" of the encrypted table A41 (steps S304 to 305).

The common comparison value generating function 63a defines i=1 as the initial value (step S306), and calculates a common comparison value d_a[b, i] 82b shown in Expression 16 from each of the i-th components d[b, i] of the column a of the encrypted table B42 and the table joining key j[a, b] shown in Expression 14 (step S307).

$$\text{Common comparison value } d_a=\text{pair}(d[b,i],j[a,b,1])^{r[b,i]} \cdot j[a,b,3]) \quad \text{(Expression 16)}$$

The concealed comparison value update function 63b replaces each of the i-th components of the concealed comparison values d[b, i] of the column b of the encrypted table B42 with the d_a[b, i] to acquire a replaced table B' 84 (step S308). Thereafter, i is incremented by 1, and the processing of steps S107 to 308 is repeated until i reaches the number of rows "M" of the encrypted table B42 (steps S309 to 310).

The natural joining function 63c performs equi-joining of the replaced tables A'B' acquired in the manner described above for requesting that the values of the column constituted with d_b[i, a] regarding each i of the column a of the replaced table A' and the column constituted with d_a[i, b] regarding each i of the column b of the replaced encrypted table B' to be equivalent (step S311). At last, the natural joining function 63c outputs the encrypted table A×B81 on which the equi-joining is completed, and returns it to the client terminal 10 (step S312). The client terminal 10 presents the encrypted table A×B81 received via the communication module 15 to the user via the output module 14.

(Effects by Processing of the Exemplary Embodiment)

The effects acquired by the processing shown above will be described.

When the column encryption device encrypts the column a of the table A by the key "key", the i-th element m[i] is replaced with the ciphertext and the concealed comparison value (e[a, i], d[a, i]) shown in following Expression 17.

$$(e[a, i], d[a, i]) = ((enc(\text{key}, (r'[a, i], m[a, i])), r'[a, i]), (g[a]^{(f[a,i]/(r[a,i]+x[a]))}, r[a, i])) \quad \text{(Expression 17)}$$

Even when a same plain text m is contained in the encrypted table A and the encrypted table B, a random number r'[a, i] selected randomly is contained in the plain text to be encrypted in the first element (ciphertext) on the right side of Expression 17, which is shown in following Expression 18. Thus, the ciphertexts acquired as the result become different. Therefore, it is not possible to judge the uniformity of the plain texts only from the ciphertexts.

$$(enc(\text{key},(r'[a,i],m[a,i])),r'[a,i]) \quad \text{(Expression 18)}$$

Further, it is also difficult to judge whether or not the same elements regarding the tables A and B shown in following Expression 19 are equivalent from the second element (concealed comparison value) on the right side of Expression 17 even if information regarding x[a] and x[b] such as $(g[c])^{\wedge}x[a]$ and $(g[d])^{\wedge}x[b]$ can be acquired in addition unless it can be proved that c=b and d=a. Therefore, it is not possible to perform natural joining in a state where only the encrypted table A and the encrypted table B are given.

$$(g[a]^{(f[a,i]/(r[a,i]+x[a]))}, r[a,i])$$

$$(g[b]^{(f[b,i]/(r[b,i]+x[b]))}, r[b,i]) \quad \text{(Expression 19)}$$

In the meantime, when natural joining is performed on the encrypted table A and the encrypted table B, the common comparison value $d\_{a}[a, i]$ shown in Expression 15 regarding the i-th component d[a, i] of the column a of the table A can be calculated as in following Expression 20, provided that (g[a])$^{\wedge}$x[b] and (g[b])$^{\wedge}$x[a], i.e., the table joining keys, are given.

$$\begin{aligned} \text{pair}(d[a, i], j[a, b, 2]^{f[a,i]} j[a, b, 2]) = & \quad \text{(Expression 20)} \\ \text{pair}(g[a]^{(f[a,i]/(r[a,i]+x[a]))}, g[b]^{f[a,i]} g[b]^{x[a]}) = & \\ \text{pair}(g[a]^{(f[a,i]/(r[a,i]+x[a]))}, g[b]^{f[a,i]+x[a]}) = & \\ \text{pair}(g[a], g[b])^{f[a,i]} & \end{aligned}$$

Further, the common comparison value d_a[b, j] shown in Expression 16 regarding the j-th component d[b, j] of the column b of the table B can be calculated as in following Expression 21.

$$\begin{aligned} \text{pair}(d[b, j], j[a, b, 1]^{f[a,i]} j[a, b, 3]) = & \quad \text{(Expression 21)} \\ \text{pair}(g[a]^{(f[b,j]/(r[b,j]+x[b]))}, g[a]^{f[b,j]} g[a]^{x[b]}) = & \\ \text{pair}(g[b]^{(f[b,j]/(r[b,j]+x[b]))}, g[a]^{f[b,j]+x[b]}) = & \\ \text{pair}(g[b], g[a])^{f[b,j]} = \text{pair}(g[a], g[b])^{f[b,j]} & \end{aligned}$$

That is, it is possible to judge whether or not f[a, i] and f[b, j] are equivalent, i.e., whether or not m[a, i] and m[b, j] are equivalent, by comparing those common comparison values d_a and d_b when the table joining keys are given. Therefore, it becomes possible to perform natural joining of the tables A and B based on the judgment result.

For this action, calculations of bilinear mapping and scalar multiplication are required. The number of the calculations are the number of the sum of the elements of the column a of the table A and the elements of the column b of the table B. That is, the calculation amount is not greatly increased for executing the actions of the exemplary embodiment.

(Overall Actions of First Exemplary Embodiment)

Next, overall actions of the above exemplary embodiment will be described. The natural joining method according to the exemplary embodiment is used in the encrypted database system constituted by mutually connecting the client terminal and the encrypted database server, with which: the encryption key is stored in advance to a recording module of the client terminal; the recording module of the client terminal encrypts the data on the a-th column of the inputted first table and the data on the b-th column of the second table by using the encryption key, and outputs the encrypted data to the outside (FIG. 4, steps S101 to 111); the data reception unit of the encrypted database server receives and records the encrypted first and second tables (FIG. 6, steps S151 to 152); the encrypted table natural joining request unit of the client terminal generates the table joining key containing the column public key and the column private key generated by the encryption key from the table identifiers of the first and the second tables and the column identifiers of the a-th and b-th columns (FIG. 8, steps S201 to 203); the encrypted table natural joining request unit of the client terminal outputs the natural joining request text for requesting natural joining of the a-th column and the b-th column of the encrypted first table and second tables by including the table joining key (FIG. 8, step S204); the encrypted table natural joining unit of the encrypted database server executes the natural joining of the encrypted first and second tables according to the natural joining request text by employing the table joining key (FIG. 10, steps S301 to 311); and the encrypted table joining unit of the encrypted database server returns the result of the natural joining to the client terminal (FIG. 10, step S312).

Note here that each of the above-described action steps may be put into a program that can be executed by a computer to have it executed by the client terminal 10 and the encrypted database server 50 as the computers which directly execute each of the steps. The program may be recorded to a non-transitory recording medium such as a DVD, a CD, or a flash memory. In that case, the program is read out from the recording medium by the computer and executed. Through such actions, the exemplary embodiment can provide following effects.

It is possible with the exemplary embodiment to prevent leakages of information by encrypting the data recorded in the database server and encrypting the elements in different tables to different values. In the meantime, it is possible to execute natural joining of two tables in the database by giving the natural joining request text containing the table joining key to the database server when necessary. The exemplary embodiment makes it possible to execute natural joining that is the processing performed frequently as the processing on the database system without decoding the data, so that it is possible to achieve both the convenience of the database system and protection of the security.

While the present invention has been described above by referring to the specific embodiment shown in the drawings, the present invention is not limited only to the embodiment described above. Any other known structures can be employed, as long as the embodiments of the present invention can be achieved therewith.

Regarding each of the embodiments described above, the new technical contents of the above-described embodiments can be summarized as follows. While a part of or a whole part of the embodiments can be summarized as follows as the new techniques, the present invention is not necessarily limited only to the followings.

(Supplementary Note 1)

An encrypted database system constituted with a client terminal and an encrypted database server mutually connected to each other, wherein the client terminal includes:

a recording module which records an encryption key in advance;

a column encryption unit which encrypts data on an a-th column of a first table and data on a b-th column of a second table inputted from outside by using the encryption key, and outputs the encrypted data to the outside; and an encrypted table natural joining request unit which outputs a natural joining request text for requesting natural joining of the a-th column and the b-th column of the encrypted first table and second tables, wherein the encrypted table natural joining request unit generates a table joining key containing a column public key and a column private key generated by the encryption key from table identifiers of the first and the second tables and column identifiers of the a-th and b-th columns, and outputs the generated key by including it in the natural joining request text, and the encrypted database server includes:

a data reception unit which receives and records the encrypted first and second tables; and an encrypted table natural joining unit which executes the natural joining of the encrypted first and second tables according to the natural joining request text by employing the table joining key.

(Supplementary Note 2)

The database system as depicted in Supplementary Note 1, wherein the column encryption unit of the client terminal includes, for the a-th column of the first table:

a column private key generating function which generates a column private key x[a] of the a-th column from the encryption key, the table identifier of the first table, and the column identifier of the a-th column;

a column public key generating function which generates a column public key g[a] of the a-th column corresponding to the column private key of the a-th column from the table identifier of the first table and the column identifier of the a-th column;

a comparison value generating function which generates comparison values from each component on the a-th column of the first table and the encryption key;

a concealed comparison value generating function which generates concealed comparison values from each of the comparison values, the encryption key, the column private key and the column public key of the a-th column;

an encrypting function which generates a ciphertext by encrypting data of the a-th column by the encryption key; and a table update function which replaces the data of the a-th column with the cipher text and the concealed comparison values to encrypt the first table, and transmits the encrypted first table to the encrypted database server, and the column encryption unit also generates a column private key x[b] and a column public key g[b] for the b-th column of the second table in the same manner, generates the comparison values, the concealed comparison values, and the ciphertext from those, encrypts the second table, and transmits it to the encrypted database server.

(Supplementary Note 3)

The encrypted database system as depicted in Supplementary Note 2, wherein:

the column encryption unit of the client terminal includes a random number generating function which generates random numbers corresponding to each component on the a-th column; and the concealed comparison value generating function of the column encryption unit generates the concealed comparison values from each of the comparison values, the encryption key, the column private key and the column public key of the a-th column, as well as the random numbers.

(Supplementary Note 4)

The encrypted database system as depicted in Supplementary Note 2, wherein the encrypted table natural joining request unit of the client terminal includes:

a table joining key generating function which generates a table joining key from the table identifier of the first table, the column identifier of the a-th column, the table identifier of the second table, the column identifier of the b-th column of the second table, and the encryption key; and a natural joining request text output function which outputs the natural joining request text from the table identifier of the first table, the column identifier of the a-th column, the table identifier of the second table, the column identifier of the b-th column, and the table joining key, and transmits it to the encrypted database server.

(Supplementary Note 5)

The encrypted database system as depicted in Supplementary Note 4, wherein the table joining key contains the column public key g[a] to the power of the column private key x[b] and the column public key g[b] to the power of the column private key x[a] as elements.

(Supplementary Note 6)

The encrypted database system as depicted in Supplementary Note 4, wherein the encrypted table natural joining request unit of the client terminal includes a column private key generating function and a column public key generating function which are same as those of the column encryption unit.

(Supplementary Note 7)

The encrypted database system as depicted in Supplementary Note 5, wherein the encrypted table natural joining unit of the encrypted database server includes:

a common comparison value generating function which generates a first common comparison value by using the element of the column public key g[b] of the table joining key to the power of the column private key x[a] from the concealed comparison value of the a-th column of the encrypted first table, and generates a second common comparison value by using the element of the column public key g[a] of the table joining key to the power of the column private key x[b] from the concealed comparison value of the b-th column of the encrypted second table;

a concealed comparison value update function which replaces the concealed comparison values on the a-th column of the encrypted first table with the first common comparison value, and replaces the concealed comparison values on the b-th column of the encrypted second table with the second common comparison value; and a natural joining function which executes natural joining of the a-th column and the b-th column of the replaced first and second tables according to the natural joining request text, and returns a result thereof to the client terminal.

(Supplementary Note 8)

A client terminal constituting an encrypted database system by being mutually connected to an encrypted database server, and the client terminal includes:

a recording module which records an encryption key in advance;

a column encryption unit which encrypts data on an a-th column of a first table and data on a b-th column of a second table inputted from outside by using the encryption key, and outputs the encrypted data to the outside; and an encrypted table natural joining request unit which outputs a natural joining request text for requesting natural joining of the a-th column and the b-th column of the encrypted first table and second tables, wherein the encrypted table natural joining request unit generates a table joining key containing a column public key and a column private key generated by the encryption key from table identifiers of the first and the second tables and column identifiers of the a-th and b-th columns, and outputs the generated key by including it in the natural joining request text.

(Supplementary Note 9)

An encrypted database server constituting an encrypted database system by being mutually connected to a client terminal, and the encrypted database server includes:

a data reception unit which receives and records the encrypted first and second tables; and an encrypted table natural joining unit which executes the natural joining of the encrypted first and second tables according to the natural joining request text by employing the table joining key.

(Supplementary Note 10)

A natural joining method used in an encrypted database system constituted with a client terminal and an encrypted database server mutually connected to each other, wherein:

an encryption key is stored in advance to a recording module of the client terminal;

the recording module of the client terminal encrypts data on an a-th column of a first table and data on a b-th column of a second table inputted from outside by using the encryption key, and outputs the encrypted data to the outside;

a data reception unit of the encrypted database server receives and records the encrypted first and second tables;

an encrypted table natural joining request unit of the client terminal generates a table joining key containing a column public key and a column private key generated by the encryption key from table identifiers of the first and the second tables and column identifiers of the a-th and b-th columns;

the encrypted table natural joining unit of the client terminal outputs the table joining key by including it in a natural joining request text for requesting natural joining of the a-th column and the b-th column of the encrypted first table and second tables;

an encrypted table natural joining unit of the encrypted database server executes the natural joining of the encrypted first and second tables according to the natural joining request text by employing the table joining key; and the encrypted table joining unit of the encrypted database server returns a result of the natural joining to the client terminal.

(Supplementary Note 11)

A natural joining program used in an encrypted database system constituted with a client terminal having an encryption key stored in advance and an encrypted database server mutually connected to each other, and the program causes a computer provided to the client terminal to execute:

a procedure for encrypting data on an a-th column of a first table and data on a b-th column of a second table inputted from outside by using the encryption key, and outputting the encrypted data to the outside;

a procedure for generating a table joining key containing a column public key and a column private key generated by the encryption key from table identifiers of the first and the second tables and column identifiers of the a-th and b-th columns; and a procedure for outputting the table joining key by including it in a natural joining request text for requesting natural joining of the a-th column and the b-th column of the encrypted first table and second tables.

(Supplementary Note 12)

A natural joining program used in an encrypted database system constituted with a client terminal and an encrypted database server mutually connected to each other, and the program causes a computer provided to the encrypted database server to execute:

a procedure for receiving and recording the encrypted first and second tables from the client terminal;

a procedure for executing the natural joining of the encrypted first and second tables according to the natural joining request text by employing the table joining key; and a procedure for returning a result of the natural joining to the client terminal.

This Application claims the Priority right based on Japanese Patent Application No. 2010-217008 filed on Sep. 28, 2010 and the disclosure thereof is hereby incorporated by reference in its entirety.

INDUSTRIAL APPLICABILITY

The present invention can be utilized in encrypted database systems. In particular, the present invention exhibits remarkable effects in the encrypted database system that holds a vast amount of data.

REFERENCE NUMERALS

1 Encrypted database system
10 Client terminal
11, 51 Main computation control module
12, 52 Recording module
13 Input module
14 Output module
15, 53 Communication module
21 Column encryption unit
21$a$, 22$a$ Column private key generating function
21$b$, 22$b$ Column public key generating function
21$c$ Comparison value generating function
21$d$ Concealed comparison value generating function
21$e$ Encrypting function
21$f$ Table update function
21$g$ Random number generating function
22 Encrypted table natural joining request unit
22$c$ Table joining key generating function
22$d$ Natural joining request text output function
31 Private key
33 Table A
33$a$, 34$a$ Table identifier
33$b$, 34$b$ Column data
33$c$, 34$c$ Column identifier
34 Table B
41 Encrypted table A
41$b$, 42$b$ Encrypted column vector
42 Encrypted table B
50 Encrypted database server
63 Encrypted table natural joining unit
63$a$ Common comparison value generating function
63$b$ Concealed comparison value update function
63$c$ Natural joining function 64 Data reception unit
71 Natural joining request text
81 Encrypted table A×B
83 Replaced table A'
84 Replaced table B'

The invention claimed is:

1. An encrypted database system constituted with a client terminal and an encrypted database server mutually connected to each other, wherein the client terminal comprises:
a recording module which preliminarily records an encryption key;
a column encryption unit which encrypts, by using the encryption key, data on an a-th column of a first table and data on a b-th column of a second table inputted in response to operation commands from a user; and
an encrypted table natural joining request unit which outputs a natural joining request text for requesting natural joining of the a-th column and the b-th column of the encrypted first table and second tables, generates a table joining key containing a column public key generated from table identifiers of the first and the second tables and column identifiers of the a-th and b-th columns and a column private key generated by the encryption key from the table identifiers and the column identifiers, and outputs the generated key by including it in the natural joining request text, and the encrypted database server comprises:
a data reception unit which receives and records the encrypted first and second tables; and
an encrypted table natural joining unit which executes the natural joining of the encrypted first and second tables according to the natural joining request text by employing the table joining key.

2. The database system as claimed in claim 1, wherein the column encryption unit of the client terminal comprises, for the a-th column of the first table:
a column private key generating function which generates a column private key x[a] of the a-th column from the encryption key, the table identifier of the first table, and the column identifier of the a-th column;
a column public key generating function which generates a column public key g[a] of the a-th column corresponding to the column private key of the a-th column from the table identifier of the first table and the column identifier of the a-th column;
a comparison value generating function which generates comparison values from each component on the a-th column of the first table and the encryption key;
a concealed comparison value generating function which generates concealed comparison values from each of the comparison values, the encryption key, the column private key and the column public key of the a-th column;
an encrypting function which generates a ciphertext by encrypting data of the a-th column by the encryption key; and
a table update function which replaces the data of the a-th column with the cipher text and the concealed comparison values to encrypt the first table, and transmits the encrypted first table to the encrypted database server, and the column encryption unit also generates a column private key x[b] and a column public key g[b] for the b-th column of the second table in the same manner, generates the comparison values, the concealed comparison values, and the ciphertext from those, encrypts the second table, and transmits it to the encrypted database server.

3. The encrypted database system as claimed in claim 2, wherein
the encrypted table natural joining request unit of the client terminal comprises:
a table joining key generating function which generates a table joining key from the table identifier of the first table, the column identifier of the a-th column, the table identifier of the second table, the column identifier of the b-th column of the second table, and the encryption key; and
a natural joining request text output function which outputs the natural joining request text from the table identifier of the first table, the column identifier of the a-th column, the table identifier of the second table, the column identifier of the b-th column, and the table joining key, and transmits it to the encrypted database server.

4. The encrypted database system as claimed in claim 3, wherein
the table joining key contains the column public key glial to the power of the column private key $x[b]$ and the column public key $g[b]$ to the power of the column private key $x[a]$ as elements.

5. The encrypted database system as claimed in claim 3, wherein
the encrypted table natural joining unit of the encrypted database server comprises:
a common comparison value generating function which generates a first common comparison value by using the element of the column public key $g[b]$ of the table joining key to the power of the column private key $x[a]$ from the concealed comparison value of the a-th column of the encrypted first table, and generates a second common comparison value by using the element of the column public key glial of the table joining key to the power of the column private key $x[b]$ from the concealed comparison value of the b-th column of the encrypted second table;
a concealed comparison value update function which replaces the concealed comparison values on the a-th column of the encrypted first table with the first common comparison value, and replaces the concealed comparison values on the b-th column of the encrypted second table with the second common comparison value; and
a natural joining function which executes natural joining of the a-th column and the b-th column of the replaced first and second tables according to the natural joining request text, and returns a result thereof to the client terminal.

6. A client terminal constituting an encrypted database system by being mutually connected to an encrypted database server, the client terminal comprising:
a recording module which preliminarily records an encryption key;
a column encryption unit which encrypts data on an a-th column of a first table and data on a b-th column of a second table inputted in response to operation commands from a user, and outputs the encrypted data to the outside; and
an encrypted table natural joining request unit which outputs a natural joining request text for requesting natural joining of the a-th column and the b-th column of the encrypted first table and second tables, generates a table joining key containing a column public key generated from table identifiers of the first and the second tables and column identifiers of the a-th and b-th columns and a column private key generated by the encryption key from the table identifiers and the column identifiers, and outputs the generated key by including it in the natural joining request text.

7. A natural joining method used in an encrypted database system constituted with a client terminal and an encrypted database server mutually connected to each other, wherein:
an encryption key is preliminarily stored to a recording module of the client terminal;
the recording module of the client terminal encrypts, by using the encryption key, data on an a-th column of a first table and data on a b-th column of a second table inputted in response to operation con ands from a user, and outputs the encrypted data to the outside;
a data reception unit of the encrypted database server receives and records the encrypted first and second tables;
an encrypted table natural joining request unit of the client terminal generates a table joining key containing a column public key generated from table identifiers of the first and the second tables and column identifiers of the a-th and b-th columns and a column private key generated by the encryption key from the table identifiers and the column identifiers;
the encrypted table natural joining unit of the client terminal outputs the table joining key by including it in a natural joining request text for requesting natural joining of the a-th column and the b-th column of the encrypted first table and second tables;
an encrypted table natural joining unit of the encrypted database server executes the natural joining of the encrypted first and second tables according to the natural joining request text by employing the table joining key; and
the encrypted table joining unit of the encrypted database server returns a result of the natural joining to the client terminal.

8. A non-transitory computer readable recording medium storing a natural joining program used in an encrypted database system constituted with a client terminal having an encryption key stored and an encrypted database server mutually connected to each other, the program causing a computer provided to the client terminal to execute:
a procedure for encrypting, using the encryption key, data on an a-th column of a first table and data on a b-th column of a second table inputted in response to operation commands from a user, and outputting the encrypted data to the outside;
a procedure for generating a table joining key containing a column public key generated from table identifiers of the first and the second tables and column identifiers of the a-th and b-th columns and a column private key generated by the encryption key from the table identifiers and the column identifiers; and
a procedure for outputting the table joining key by including it in a natural joining request text for requesting natural joining of the a-th column and the b-th column of the encrypted first table and second tables.

9. An encrypted database system constituted with a client terminal and an encrypted database server mutually connected to each other, wherein
the client terminal comprises:
recording means for preliminarily recording an encryption key;
column encryption means for encrypting, using the encryption key, data on an a-th column of a first table and data on a b-th column of a second table inputted in response to operation con ands from a user, and outputting the encrypted data to the outside; and
encrypted table natural joining request means for outputting a natural joining request text for requesting natural joining of the a-th column and the b-th column of the encrypted first table and second tables, generating a table joining key containing a column public key generated from table identifiers of the first and the second tables and column identifiers of the a-th and b-th columns and a column private key generated by the encryption key from the table identifiers and the column identifiers, and outputting the generated key by including it in the natural joining request text, and
the encrypted database server comprises:
data reception means for receiving and recording the encrypted first and second tables; and
encrypted table natural joining means for executing the natural joining of the encrypted first and second tables according to the natural joining request text by employing the table joining key.

10. A client terminal constituting an encrypted database system by being mutually connected to an encrypted database server, the client terminal comprising:
recording means for preliminarily recording an encryption key;
column encryption means for encrypting data on an a-th column of a first table and data on a b-th column of a second table inputted in response to operation commands from a user, and outputting the encrypted data to the outside; and
encrypted table natural joining request means for outputting a natural joining request text for requesting natural joining of the a-th column and the b-th column of the encrypted first table and second tables, generating a table joining key containing a column public key generated from table identifiers of the first and the second tables and column identifiers of the a-th and b-th columns and a column private key generated by the encryption key from the table identifiers and the column identifiers, and outputting the generated key by including it in the natural joining request text.

* * * * *